United States Patent
Varma et al.

(10) Patent No.: US 12,449,874 B2
(45) Date of Patent: Oct. 21, 2025

(54) SYSTEMS AND METHODS FOR ADAPTIVE POWER ALLOCATIONS IN A HETEROGENEOUS COMPUTING PLATFORM

(71) Applicant: Dell Products, L.P., Round Rock, TX (US)

(72) Inventors: Suraj M Varma, Portland, OR (US); Daniel L. Hamlin, Round Rock, TX (US); Travis C. North, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 49 days.

(21) Appl. No.: 18/063,114

(22) Filed: Dec. 8, 2022

(65) Prior Publication Data
US 2024/0192748 A1    Jun. 13, 2024

(51) Int. Cl.
*G06F 1/28* (2006.01)
*G06F 9/445* (2018.01)

(52) U.S. Cl.
CPC ............ *G06F 1/28* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 7,421,601 B2* | 9/2008 | Bose | G06F 1/3203 713/320 |
| 8,898,494 B2* | 11/2014 | Schluessler | G06F 1/3253 713/320 |
| 10,037,070 B2* | 7/2018 | Wang | G06F 1/3265 |
| 10,884,475 B1* | 1/2021 | Wang | G06F 1/3296 |
| 2010/0131781 A1* | 5/2010 | Memon | G06F 1/3209 709/224 |
| 2011/0090640 A1* | 4/2011 | Samson | G06F 1/206 361/679.46 |
| 2013/0046967 A1* | 2/2013 | Fullerton | G06F 1/32 713/100 |
| 2016/0370844 A1* | 12/2016 | Kumar | G06F 3/0416 |
| 2017/0031431 A1* | 2/2017 | Khatri | G06F 1/3246 |
| 2017/0219240 A1* | 8/2017 | Cassini | G06F 1/206 |
| 2018/0004275 A1* | 1/2018 | Tubbs | G06F 1/3287 |

(Continued)

*Primary Examiner* — Danny Chan
(74) *Attorney, Agent, or Firm* — Fogarty LLP

(57) ABSTRACT

Systems and methods for managing performance in heterogenous computing platforms of IHSs (Information Handling Systems) are described. In an illustrative, non-limiting embodiment, a heterogeneous computing platform includes devices and a memory storing firmware instructions. Based on execution of these firmware instructions by a respective device, a corresponding firmware service is provided such that one of the devices operates as an orchestrator. The orchestrator receives reports of changes in context of operation of the IHS by a user and determines a power allocation that is mapped to the reported user context, where the mapping allocates available power to the plurality of devices of the heterogeneous computing platform. The orchestrator configures the power that available for use by one or more of the plurality of devices of the heterogeneous computing platform, and thus adjusts the performance of the IHS in response to the change in user context.

18 Claims, 12 Drawing Sheets

(56) References Cited

U.S. PATENT DOCUMENTS

| | | | |
|---|---|---|---|
| 2018/0018018 A1* | 1/2018 | Klingström | G06F 3/013 |
| 2020/0133358 A1* | 4/2020 | Mishra | G06V 10/774 |
| 2021/0125664 A1* | 4/2021 | Holland | G06T 19/006 |
| 2021/0191490 A1* | 6/2021 | Kandula | G06F 1/324 |
| 2022/0164011 A1* | 5/2022 | Sahu | G01K 3/005 |
| 2022/0187893 A1* | 6/2022 | Sakarda | G06F 1/3212 |
| 2022/0342469 A1* | 10/2022 | Chen | G06F 1/28 |
| 2022/0374130 A1* | 11/2022 | Pu | G06F 16/122 |
| 2023/0043991 A1* | 2/2023 | Comer | G06F 11/00 |
| 2023/0214000 A1* | 7/2023 | Dewey | G06F 1/3212 |
| | | | 713/324 |

* cited by examiner

SYSTEMS AND METHODS FOR ADAPTIVE POWER ALLOCATIONS IN A HETEROGENEOUS COMPUTING PLATFORM

FIELD

This disclosure relates generally to Information Handling Systems (IHSs), and more specifically, to systems and methods for managing performance capabilities of heterogenous computing platforms.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, IHSs with desktop and laptop form factors have had full-fledged Operating Systems (OSs) (e.g., WINDOWS, LINUX, MAC OS, etc.) executed on "x86" processors. Other types of processors, such as ARM processors, have been associated with smartphones and tablet devices, which typically carry thinner, simpler, or mobile OSs (e.g., ANDROID, IOS, WINDOWS MOBILE, etc.). In recent years, however, IHS manufacturers have started releasing desktop and laptop IHSs equipped with ARM processors, and newer OSs (e.g., WINDOWS on ARM) can now provide users with a more quintessential OS experience on those IHSs.

The inventors hereof have recognized that the IHS industry's transition from x86 to ARM-based processors has created new management, customization, optimization, interaction, servicing, and configuration opportunities for IHS users, Information Technology Decision Makers (ITDMs), and Original Equipment Manufacturers (OEMs).

SUMMARY

Systems and methods for managing power allocations for devices of heterogenous computing platforms are described. In an illustrative, non-limiting embodiment, an Information Handling System (IHS) may include: a heterogeneous computing platform comprising a plurality of devices; and a memory coupled to the heterogeneous computing platform, wherein the memory comprises a plurality of sets of firmware instructions, wherein each of the sets of firmware instructions, upon execution by a respective device among the plurality of devices, enables the respective device to provide a corresponding firmware service, and wherein at least one of the plurality of devices operates as an orchestrator configured to: receive a report of a change in a context of operation of the IHS by a user; determine a power allocation that is mapped to the reported user context and that allocates available power to the plurality of devices of the heterogeneous computing platform; and configure the power that available for use by one or more of the plurality of devices of the heterogeneous computing platform.

In some embodiments, the reported change in user context comprises a detected change in a proximity of the user of the IHS. In some embodiments, the reported change in user context comprises a detected change in a physical orientation of the user relative to the IHS. In some embodiments, the reported change in user context comprises a detected change in an attentiveness of the user. In some embodiments, the detected change in an attentiveness of the user comprises an attentiveness to content displayed by the IHS. In some embodiments, the reported change in user context is detected by a sensor hub of the heterogeneous computing platform. In some embodiments, the heterogeneous computing platform comprises at least one of a x86 processor and an ARM processor. In some embodiments, the power allocation mapped to the user context comprises an allocation of available power that supports operations that exceed thermal constraints on operation of the IHS. In some embodiments, the thermal constraints on operation of the IHS comprise a cool mode that limits an outer surface temperature of the IHS. In some embodiments, the power allocation increases the outer surface temperature of the IHS during an interval when the reported user context indicates the user is not in proximity to the IHS. In some embodiments, the thermal constraints on operation of the IHS comprise a quiet mode that limits noise generated by the IHS. In some embodiments, the power allocation increases power allocated to a high-power device of the heterogeneous computing platform and increases noise generated by an airflow cooling system of the IHS during an interval when the reported user context indicates the user is not in proximity to the IHS. In some embodiments, the reported user context indicates the user is returning to the proximity of the IHS and wherein the power allocation decreases power allocated to the high-power device and decreases noise generated by the airflow cooling system of the IHS. In some embodiments, the reported user context comprises a user-initiated launching of a process by a device of the heterogeneous computing platform. In some embodiments, the power allocation increases power allocated to the device of the heterogeneous computing platform that is launching the user-initiated process. In some embodiments, the reported user context comprises a user-initiated event within a software application operating on a graphics processor of the heterogeneous computing platform. In some embodiments, the power allocation increases power allocated to the graphics processor of the heterogeneous computing platform.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
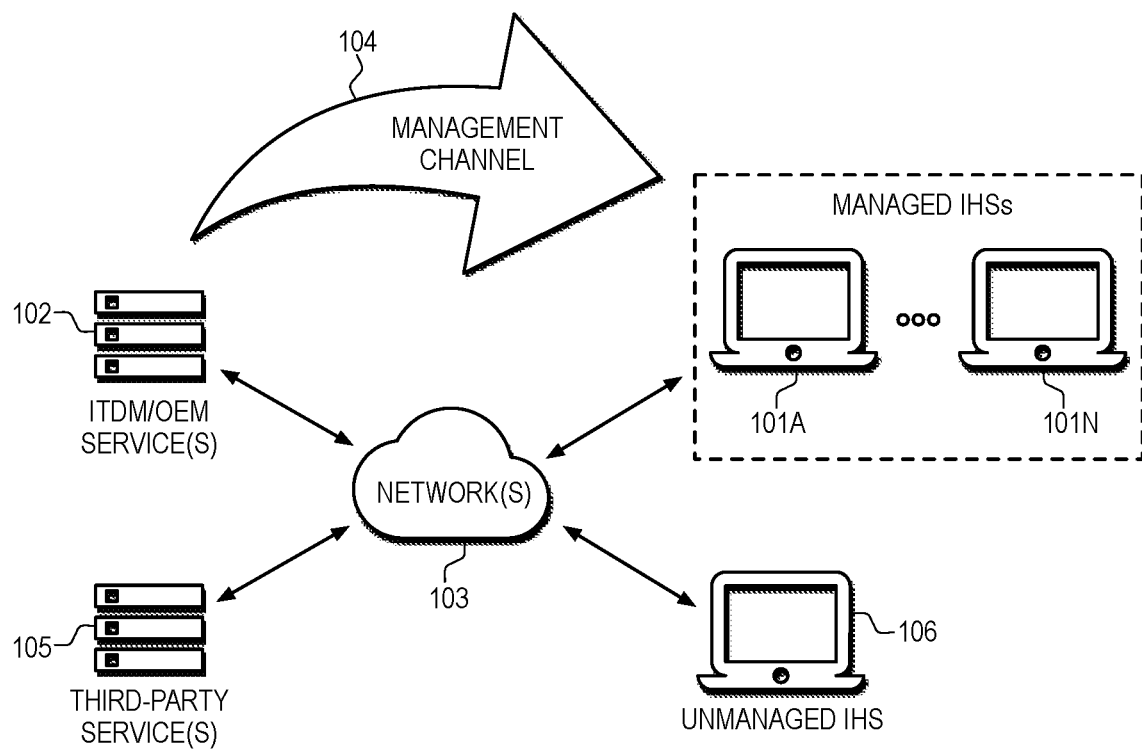
FIG. 1 is a diagram illustrating an example of an environment where systems and methods described herein may be implemented, according to some embodiments.
Figure 3:
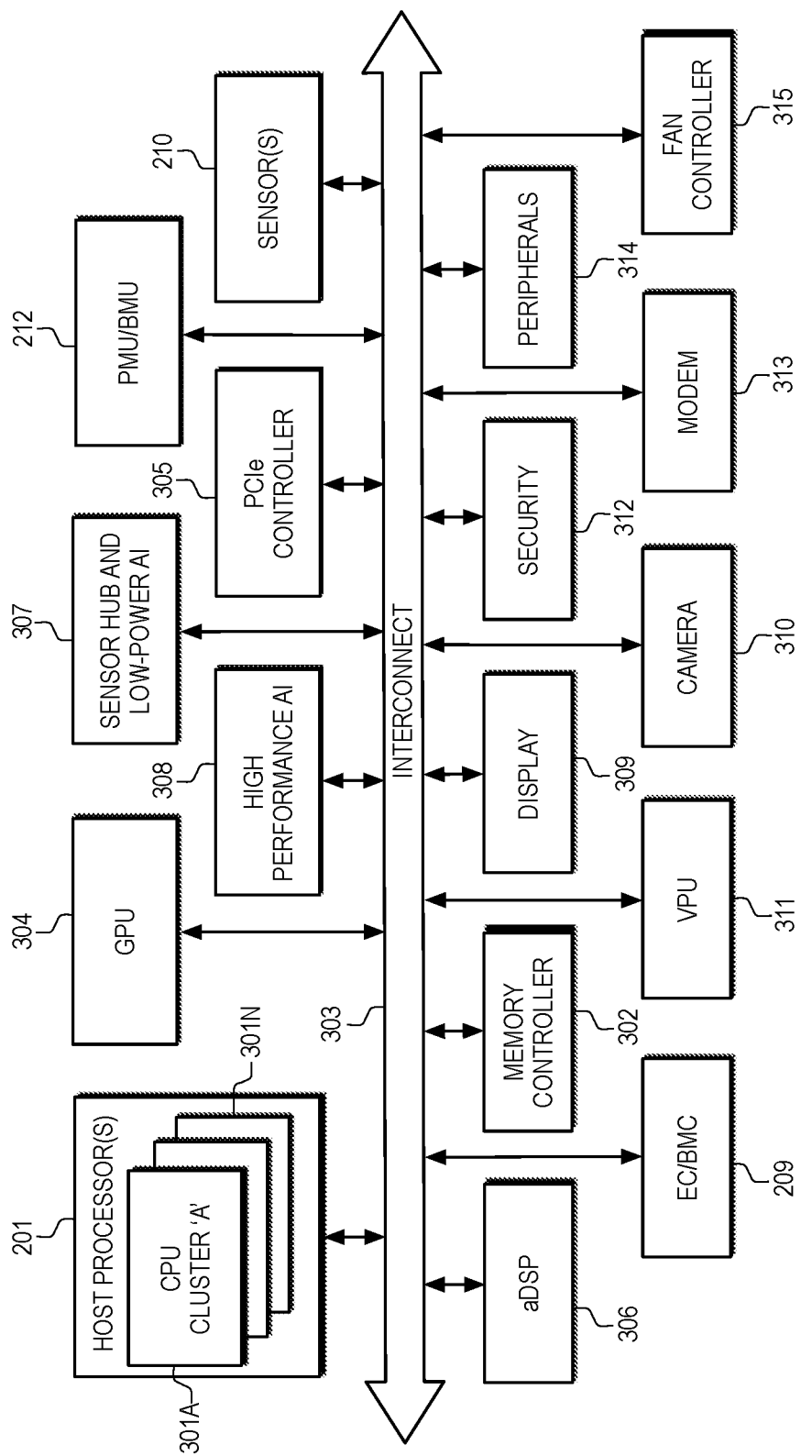
FIG. 3 is a diagram illustrating an example of a heterogenous computing platform, according to some embodiments.

FIG. 1 is a diagram illustrating an example of environment 100 where systems and methods described herein may be implemented. In various embodiments, managed IHSs 101A-N may be accessible to Information Technology (IT) Decision Maker (ITDM) or Original Equipment Manufacturer (OEM) service(s) 102 over network(s) 103 (e.g., the Internet, an intranet, etc.) via management channel 104. Moreover, one or more of managed IHSs 101A-N may be equipped with heterogenous computing platform 300 (FIG. 3).

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package. Each device in the platform has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc.

ITDM/OEM service(s) 102 may be provided on premises, along with one or more of managed IHSs 101A-N, or may be remotely located with respect to managed IHSs 101A-N. For example, one or more of managed IHSs 101A-N may be deployed within an enterprise, business, or corporation having an ITDM in charge of managing the usage, operation, servicing, configuration, and other aspects of IHSs 101A-N.

Particularly, an ITDM may use one or more management tools executed by ITDM service(s) 102 to establish management channel 104 with managed IHSs 101A-N. Examples of management tools may include, but are not limited to, WINDOWS Admin Center, MICROSOFT Endpoint Configuration Manager, System Center Configuration Manager (SCCM), AZURE, INTUNE, VMWARE WORKSPACE ONE, etc.

ITDM/OEM service(s) 102 may include an ITDM or OEM database. Such a database may include, for instance: an identification of managed IHSs 101A-N (e.g., by service tag, serial number, etc.), an inventory of IHS components installed in managed IHSs 101A-N (e.g., components integrated into managed IHSs 101A-N, peripheral devices coupled to managed IHSs 101A-N, etc.), an identification of a heterogenous computing platform 300 installed in managed IHSs 101A-N, a list of authorized users, usernames, passwords, logon credentials, cryptographic keys, digital certificates, Operating System (OS) installation or update packages, software application installation or update packages, firmware installation or update packages, hardware policies, software policies, telemetry collected from managed IHSs 101A-N, customer/client support information, etc.

In some cases, one or more management operations performed by ITDM/OEM service(s) 102 via management channel 104 may be selected or modified, at least in part, based upon information stored in the ITDM or OEM database. For example, a different firmware installation package containing a base driver and/or extension drivers (also referred to as information or "INF" drivers) may be selected, assembled, and/or delivered to each one of managed IHSs 101A-N, specifically for that IHSs' heterogenous computing platform.

The term "firmware," as used herein, refers to a class of program instructions that provides low-level control for a device's hardware. Generally, firmware enables basic operations of a device and/or provides hardware abstraction services to higher-level software, such as an OS. The term "firmware installation package," as used herein, refers to program instructions that, upon execution, deploy device drivers or services in an IHS or IHS component.

The term "device driver" or "driver," as used herein, refers to program instructions that operate or control a particular type of device. A driver provides a software interface to hardware devices, enabling an OS and other applications to access hardware functions without needing to know precise details about the hardware being used. When an application invokes a routine in a driver, the driver issues commands to a corresponding device. Once the device sends data back to the driver, the driver may invoke certain routines in the application. Generally, device drivers are hardware dependent and OS-specific.

Still referring to environment 100, any of managed IHSs 101A-N may be in communication with any other one of managed IHSs 101A-N and/or with another, third-party IHS 106, which is not necessarily managed by ITDM/OEM service(s) 102, over network(s) 103. Additionally, or alternatively, any of managed IHSs 101A-N may be in communication with third-party service(s) 105 (e.g., a cloud or remote service).

Examples of third-party service(s) 105 may include, but are not limited to, collaboration services (e.g., ZOOM, TEAMS, etc.), productivity services (e.g., MICROSOFT EXCHANGE servers, OFFICE 360, etc.), Artificial Intelligence (AI) services (e.g., AI as a Service or "AIaaS"), etc. In the case of AIaaS, orchestrator 501A (FIG. 6) of heterogenous computing platform 300 (FIG. 3) within managed IHSs 101A-N may assign or offload the execution of one or more AI models, at least in part, to third-party service(s) 105 (e.g., to debug an AI model when a failure occurs, to evaluate model parameters using more powerful servers, etc.).

As used herein, the terms "Artificial Intelligence" (AI) and "Machine Learning" (ML) are used interchangeably to refer to systems, computers, or machines that mimic human intelligence to perform tasks (and to iteratively improve themselves) based on the information they collect. Generally, AI is implemented through the execution, deployment, or serving of "AI models."

The term "AI model," as used herein, generally refers to a computer-executed algorithm that emulates logical decision-making based on data. In various embodiments, AI model(s) may implement: a neural network (e.g., artificial neural network, deep neural network, convolutional neural network, recurrent neural network, transformers, autoencoders, reinforcement learning, etc.), fuzzy logic, deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), etc.

Non-limiting examples of software and libraries which may be utilized within embodiments of systems and methods described herein to perform AI modeling operations include, but are not limited to: PYTHON, OPENCV, scikit-learn, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.Ish, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN.

Generally, an AI model may be executed or deployed as a service. In some cases, a container system (e.g., DOCKER, KUBERNETES, etc.) may operate as a "box" for an AI model that creates reproducible, scalable, and isolated environments where users can set up dependencies so the AI model can work in any desired execution environment, such as, for example, a selected one of the plurality of devices in heterogenous computing platform 300 (FIG. 3), host OS 400 (FIG. 4), and/or third-party service(s) 105.

Figure 2:
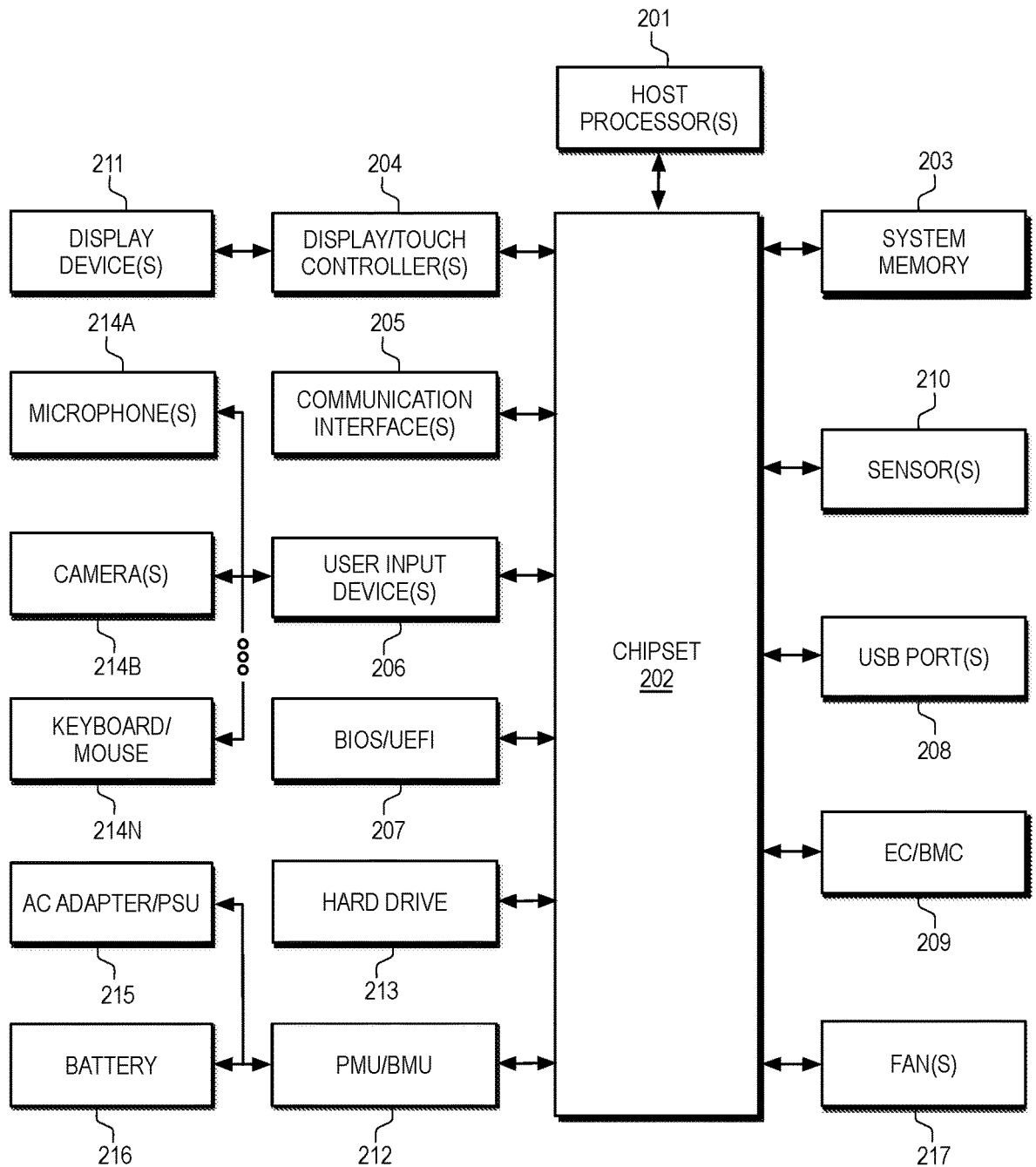
FIG. 2 is a diagram illustrating examples of components of an Information Handling System (IHS), according to some embodiments.

FIG. 2 is a block diagram of components of IHS 200, which may be used to implement any of managed IHSs 101A-N, unmanaged IHS 106, ITDM/OEM service(s) 102, and/or third-party service(s) 105 (FIG. 1).

As depicted, IHS 200 includes host processor(s) 201. In various embodiments, IHS 200 may be a single-processor system, or a multi-processor system including two or more processors. Host processor(s) 201 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 200 includes chipset 202 coupled to host processor(s) 201. Chipset 202 may provide host processor(s) 201 with access to several resources. In some cases, chipset 202 may utilize a QuickPath Interconnect (QPI) bus to communicate with host processor(s) 201.

Chipset 202 may also be coupled to communication interface(s) 205 to enable communications between IHS 200 and various wired and/or wireless networks, such as Ethernet, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 205 may also be used to communicate with certain peripherals devices (e.g., BT speakers, microphones, headsets, etc.). Moreover, communication interface(s) 205 may be coupled to chipset 202 via a Peripheral Component Interconnect Express (PCIe) bus, or the like.

Chipset 202 may be coupled to display/touch controller(s) 204, which may include one or more or Graphics Processor Units (GPUs) on a graphics bus, such as an Accelerated Graphics Port (AGP) or PCIe bus. As shown, display/touch controller(s) 204 provide video or display signals to one or more display device(s) 211.

Display device(s) 211 may include Liquid Crystal Display (LCD), Light Emitting Diode (LED), organic LED (OLED), or other thin film display technologies. Display device(s) 211 may include a plurality of pixels arranged in a matrix, configured to display visual information, such as text, two-dimensional images, video, three-dimensional images, etc. In some cases, display device(s) 211 may be provided as a single continuous display, or as two or more discrete displays.

Chipset 202 may provide host processor(s) 201 and/or display/touch controller(s) 204 with access to system memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 202 may also provide host processor(s) 201 with access to one or more Universal Serial Bus (USB) ports 208, to which one or more peripheral devices may be coupled (e.g., integrated or external webcams, microphones, speakers, etc.).

Chipset 202 may further provide host processor(s) 201 with access to one or more hard disk drives, solid-state drives, optical drives, or other removable-media drives 213.

Chipset 202 may also provide access to one or more user input devices 206, for example, using a super I/O controller or the like. Examples of user input devices 206 include, but are not limited to, microphone(s) 214A, camera(s) 214B, and keyboard/mouse 214N. Other user input devices 206 may include a touchpad, stylus or active pen, totem, etc.

Each of user input devices 206 may include a respective controller (e.g., a touchpad may have its own touchpad controller) that interfaces with chipset 202 through a wired or wireless connection (e.g., via communication interfaces(s) 205). In some cases, chipset 202 may also provide access to one or more user output devices (e.g., video projectors, paper printers, 3D printers, loudspeakers, audio headsets, Virtual/Augmented Reality (VR/AR) devices, etc.)

In certain embodiments, chipset 202 may further provide an interface for communications with hardware sensors 210.

Sensors 210 may be disposed on or within the chassis of IHS 200, or otherwise coupled to IHS 200, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 200, host processor(s) 201 may utilize program instructions of Basic Input/Output System (BIOS) 207 to initialize and test hardware components coupled to IHS 200 and to load host OS 400 (FIG. 4) for use by IHS 200. BIOS 207 provides an abstraction layer that allows host OS 400 to interface with certain IHS components 200. Relying upon the hardware abstraction layer provided by BIOS 207, software stored in system memory 203 and executed by host processor(s) 201 can interface with certain I/O devices that are coupled to IHS 200.

The Unified Extensible Firmware Interface (UEFI) was designed as a successor to BIOS. As a result, many modern IHSs utilize UEFI in addition to or instead of a BIOS. As used herein, BIOS 207 is intended to also encompass a UEFI component.

Embedded Controller (EC) or Baseboard Management Controller (BMC) 209 is operational from the very start of each IHS power reset and handles various tasks not ordinarily handled by host processor(s) 201. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 212, alternating current (AC) adapter/Power Supply Unit (PSU) 215 and/or battery 216, allowing remote diagnostics and remediation over network(s) 103, etc.

For example, EC/BMC 209 may implement operations for interfacing with power adapter/PSU 215 in managing power for IHS 200. Such operations may be performed to determine the power status of IHS 200, such as whether IHS 200 is operating from AC adapter/PSU 215 and/or battery 216.

Firmware instructions utilized by EC/BMC 209 may also be used to provide various core operations of IHS 200, such as power management and management of certain modes of IHS 200 (e.g., turbo modes, maximum operating clock frequencies of certain components, etc.).

In addition, EC/BMC 209 may implement operations for detecting certain changes to the physical configuration or posture of IHS 200. For instance, when IHS 200 as a 2-in-1 laptop/tablet form factor, EC/BMC 209 may receive inputs from a lid position or hinge angle sensor 210, and it may use those inputs to determine: whether the two sides of IHS 200 have been latched together to a closed position or a tablet position, the magnitude of a hinge or lid angle, etc. In response to these changes, the EC may enable or disable certain features of IHS 200 (e.g., front or rear facing camera, etc.).

In some cases, EC/BMC 209 may be configured to identify any number of IHS postures, including, but not limited to: laptop, stand, tablet, or book. For example, when display(s) 211 of IHS 200 is open with respect to a horizontal keyboard portion, and the keyboard is facing up, EC/BMC 209 may determine IHS 200 to be in a laptop posture. When display(s) 211 of IHS 200 is open with respect to the horizontal keyboard portion, but the keyboard is facing down (e.g., its keys are against the top surface of a table), EC/BMC 209 may determine IHS 200 to be in a stand posture. When the back of display(s) 211 is closed against the back of the keyboard portion, EC/BMC 209 may determine IHS 200 to be in a tablet posture. When IHS 200 has two display(s) 211 open side-by-side, EC/BMC 209 may determine IHS 200 to be in a book posture. In some implementations, EC/BMC 209 may also determine if display(s) 211 of IHS 200 are in a landscape or portrait orientation.

In some cases, EC/BMC 209 may be installed as a Trusted Execution Environment (TEE) component to the motherboard of IHS 200.

Additionally, or alternatively, EC/BMC 209 may be configured to calculate hashes or signatures that uniquely identify individual components of IHS 200. In such scenarios, EC/BMC 209 may calculate a hash value based on the configuration of a hardware and/or software component coupled to IHS 200. For instance, EC/BMC 209 may calculate a hash value based on all firmware and other code or settings stored in an onboard memory of a hardware component.

Hash values may be calculated as part of a trusted process of manufacturing IHS 200 and may be maintained in secure storage as a reference signature. EC/BMC 209 may later recalculate the hash value for a component may compare it against the reference hash value to determine if any modifications have been made to the component, thus indicating that the component has been compromised. In this manner, EC/BMC 209 may validate the integrity of hardware and software components installed in IHS 200.

In various embodiments, IHS 200 may be coupled to an external power source (e.g., AC outlet or mains) through an AC adapter/PSU 215. AC adapter/PSU 215 may include an adapter portion having a central unit (e.g., a power brick, wall charger, or the like) configured to draw power from an AC outlet via a first electrical cord, convert the AC power to direct current (DC) power, and provide DC power to IHS 200 via a second electrical cord.

Additionally, or alternatively, AC adapter/PSU 215 may include an internal or external power supply portion (e.g., a switching power supply, etc.) connected to the second electrical cord and configured to convert AC to DC. AC adapter/PSU 215 may also supply a standby voltage, so that most of IHS 200 can be powered off after preparing for hibernation or shutdown, and powered back on by an event (e.g., remotely via wake-on-LAN, etc.). In general, AC adapter/PSU 215 may have any specific power rating, measured in volts or watts, and any suitable connectors.

IHS 200 may also include internal or external battery 216. Battery 216 may include, for example, a Lithium-ion or Li-ion rechargeable device capable of storing energy sufficient to power IHS 200 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 212 governs power functions of IHS 200, including AC adapter/PSU 215 and battery 216. For example, PMU 212 may be configured to: monitor power connections and battery charges, charging batteries, control power to other components, devices, or ICs, shut down components when they are left idle, control sleep and power functions (On and Off), managing interfaces for built-in keypad and touchpads, regulate real-time clocks (RTCs), etc.

In some implementations, PMU 212 may include one or more Power Management Integrated Circuits (PMICs) configured to control the flow and direction or electrical power in IHS 200. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 212 may include a Battery Management Unit (BMU) (referred to collectively as "PMU/BMU 212"). AC adapter/PSU 215 may be removably coupled to a battery charge controller within PMU/BMU 212 to provide IHS 200 with a source of DC power from battery cells within battery 216 (e.g., a lithium ion (Li-ion) or nickel metal hydride (NiMH) battery pack including one or more rechargeable batteries). PMU/BMU 212 may include non-volatile memory and it may be configured to collect and store battery status, charging, and discharging information, and to provide that information to other IHS components, such as, for example devices within heterogeneous computing platform 300 (FIG. 3).

Examples of information collected and stored in a memory within PMU/BMU 212 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 212. Power draw data may also be monitored with respect to individual components or devices of IHS 200. Whenever applicable, PMU/BMU 212 may administer the execution of a power policy, or the like.

IHS 200 may also include one or more fans 217 configured to cool down one or more components or devices of IHS 200 disposed inside a chassis, case, or housing. Fan(s) 217 may include any fan inside, or attached to, IHS 200 and used for active cooling. Fan(s) 217 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 200 may not include all the components shown in FIG. 2. In other embodiments, IHS 200 may include other components in addition to those that are shown in FIG. 2. Furthermore, some components that are represented as separate components in FIG. 2 may instead be integrated with other components, such that all or a portion of the operations executed by the illustrated components may instead be executed by the integrated component.

For example, in various embodiments described herein, host processor(s) 201 and/or other components of IHS 200 (e.g., chipset 202, display/touch controller(s) 204, communication interface(s) 205, EC/BMC 209, etc.) may be replaced by discrete devices within heterogenous computing platform 300 (FIG. 3). As such, IHS 200 may assume different form factors including, but not limited to: servers, workstations, desktops, laptops, appliances, video game consoles, tablets, smartphones, etc.

FIG. 3 is a diagram illustrating an example of heterogenous computing platform 300. In various embodiments, platform 300 may be implemented in an SoC, FPGA, ASIC, or the like. Platform 300 includes a plurality of discrete or segregated devices, each device having a different set of processing capabilities suitable for handling a particular type of computational task. When each device in platform 300 executes only the types of computational tasks it was specifically designed to execute, the overall power consumption of platform 300 is made more efficient.

In various implementations, each device in platform 300 may include its own microcontroller(s) or core(s) (e.g., ARM core(s)) and corresponding firmware. In some cases, a device in platform 300 may also include its own hardware-embedded accelerator (e.g., a secondary or co-processing core coupled to a main core).

Each device in platform 300 may be accessible through a respective Application Programming Interface (API). Additionally, or alternatively, each device in platform 300 may execute its own OS. Additionally, or alternatively, one or more of devices in platform 300 may be a virtual device.

In certain embodiments, at least one device in platform 300 may have updatable firmware which, upon installation, operates to change the performance, available features, settings, configuration options, API, drivers, and/or services provided by that device. For example, each update may be delivered to platform 300 as a system-wide firmware installation package having a plurality of firmware components, and each firmware component may be distributed to its respective device (or corresponding memory space).

In some implementations, the latest system-wide firmware installation package received by platform 300 may be installed at every boot of IHS 200.

In the example of FIG. 3, platform 300 includes CPU clusters 301A-N as an implementation of host processor(s) 201 intended to perform general-purpose computing operations. Each of CPU clusters 301A-N may include a plurality or processing cores and a cache memory. In operation, CPU clusters 301A-N may be made available and accessible to host OS 400, optimization/customization application(s) 412, OS agent(s) 413, and/or other application(s) 414 (FIG. 4) executed by IHS 200.

CPU clusters 301A-N are coupled to memory controller 302 via main bus or interconnect 303. Memory controller 302 is responsible for managing memory accesses for all of devices connected to interconnect 303, which may include any communication bus suitable for inter-device communications within an SoC (e.g., Advanced Microcontroller Bus Architecture or "AMBA," QPI, HyperTransport or "HT," etc.). All devices coupled to interconnect 303 can communicate with each other and with a host OS executed by CPU clusters 301A-N through interconnect 303.

GPU 304 is a device designed to produce graphical or visual content and to communicate that content to a monitor or display, where the content may be rendered.

PCIe controller or root complex 305 provides an entry point into any additional devices external to platform 300 that have a respective PCIe interface (e.g., graphics cards, USB controllers, etc.).

Audio Digital Signal Processor (aDSP) 306 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc.

In operation, input and/or output audio streams may pass through and be processed by aDSP 306, which can send the processed audio to other devices on interconnect 303 (e.g., CPU clusters 301A-N). aDSP 306 may also be configured to process one or more of platform 300's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.). To that end, aDSP 306 may be coupled to BMU 212.

In some cases, aDSP 306 may execute a firmware service configured to: retrieve raw battery data from PMU/BMU 212, preprocess the raw data, and prepare features or attributes (e.g., select, reduce, concatenate, group, etc.) for subsequent processing. Furthermore, to change a PMU/BMU 212 setting, aDSP 306 may communicate with EC/BMC 209 and/or PMU/BMU 212 to request a change to that setting. Examples of PMU/BMU 212 settings may include, but are not limited to: a charge rate 'C' (e.g., 0.5 C for slow charges, 0.3 C for trickle charging, 2.5 C for fast charging, etc.), a sustained or average peak power (SPP) parameter, a maximum peak power (MPP) parameter, a maximum charge current (MCC) parameter, etc.

Sensor hub and low-power AI device 307 is a very low power, always-on device designed to consolidate information received from other devices in platform 300, process any context and/or telemetry data streams, and provide that information to: (i) host OS 400, (ii) applications 412-414, and/or (iii) other devices in platform 300. For example, sensor hub and low-power AI device 307 may include general-purpose input/output (GPIOs) that provide Inter-Integrated Circuit ($I^2C$), Serial Peripheral Interface (SPI), and/or serial interfaces to receive data from sensors (e.g., sensors 210, camera 310, peripherals 314, etc.).

As used herein, the terms "context data" or "contextual data" refer broadly to any relevant, background information that can provide a broader understanding of an entity or event. Generally, context data may come from various sources, and it may be used to provide insights into an IHS's operation and/or of a user's behavior patterns, thereby improving their experience.

For instance, examples of context data accessible by orchestrator 501A (FIG. 6) may include, but are not limited to: a type of audio environment indicative of the types of sounds being produced near a user of IHS 200 (e.g., indoors, outdoors, home, office, restaurant, car, airport, airplane, etc.), gyroscope data (e.g., an indication of an angular velocity, for example, in mV/deg/s), accelerometer data (e.g., an indication of a linear acceleration, for example, in mV/g), a Global Positioning System (GPS) or wireless network location data, Red-Green-Blue (RGB) image or camera data, infrared (IR) image or camera data, eye-gaze direction data, audio data, IHS posture data, a time-of-day/week/month/year, calendar event data, a role of the user (e.g., as an employee in an enterprise, as a participant of a collaboration session, etc.), a language of the user, data related to software applications in execution by IHS 200 (e.g., number of windows open, number of minimized windows, identity or type of applications 412-414 in execution, number of applications 412-414 in execution, etc.), financial/economic data, news, weather, traffic, social media activity, purchasing data, shipping or delivery data, etc.

In some cases, context data may be used to identify presence hint(s) and/or user engagement cue(s). As used herein, the term "presence hints" refers to any information usable to characterize whether a user is present or absent before IHS 200 and/or a distance between the user of IHS 200. For example, presence hints may include (or be derived from) data received from presence or proximity sensors 210, camera 310, peripheral devices 314 (e.g., whether the user is typing at a keyboard or moving a mouse), etc.

The term "user engagement cue" refers to any user's action, such as utterances, movements, stances, gestures (e.g., fingers, hand, arm, head, body, etc.), or other behavior indicative of whether and/or to what degree a user is engaged with aspects of IHS 200 and/or applications 412-414. In various implementations, to identify a user engagement cue, one or more devices in heterogenous computing platform 300 may be configured to perform speech and/or gesture recognition operations based on audio and/or video data streams captured with microphone(s) 214A and/or camera(s) 214B. Moreover, to determine a level of engagement of a user, orchestrator 501A may keep track of one or more engagement cues and calculate an engagement score based upon the number, frequency of occurrence, and/or weight of the detected cue(s).

The term "telemetry data," as used herein, refers to information resulting from in situ collection of measurements or other data by devices 301-315, or any other IHS device or component, and its transmission (e.g., automatically) to a receiving entity, such as orchestrator 501A (FIG. 6), for example, for monitoring purposes. Typically, telemetry data may include, but is not limited to, measurements, metrics, and/or values which may be indicative of: core utilization, memory utilization, network quality and utilization, battery utilization, peripheral or I/O device utilization, etc.

For instance, telemetry data may include, but is not limited to, measurements, metrics, logs, or other information related to: current or average utilization of devices 301-315 or other IHS components, CPU/core loads, instant or average power consumption of devices 301-315 or other IHS components, instant or average memory usage by devices 301-315 or other IHS components, characteristics of a network or radio system (e.g., WiFi vs. 5G, bandwidth, latency, errors, etc.), keyboard, mice, trackpad, or trackball usage data, transaction times, latencies, response codes, errors, data collected from sensors 210, etc.

It should be noted that, in some implementations, there may be overlap between context data and telemetry data and/or sources. In other implementations, however, context data and telemetry data and/or sources may be distinct from each other.

Figure 6:
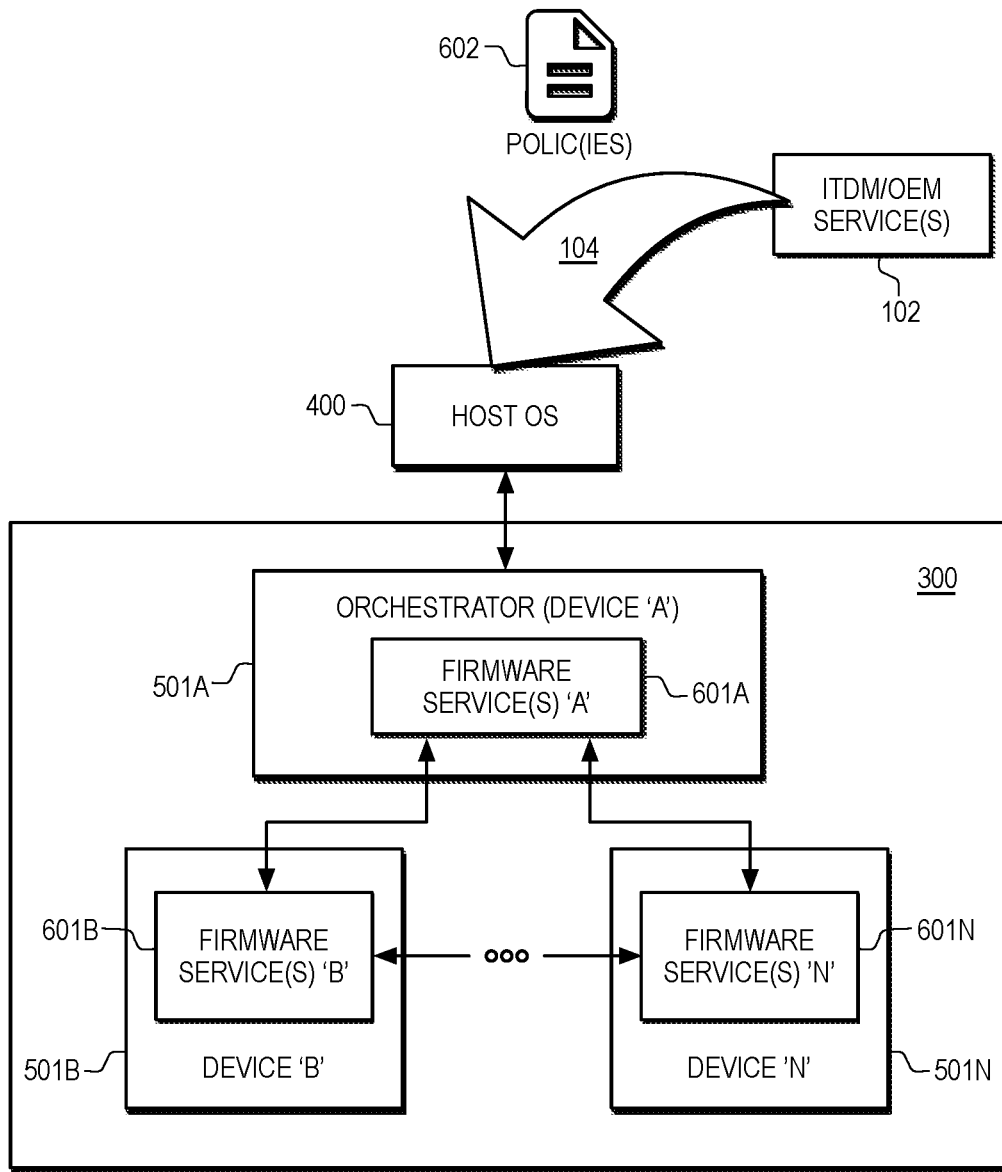
FIG. 6 is a diagram illustrating an example of an orchestration system where an orchestrator device is configured to manage other devices in a heterogenous computing platform, according to some embodiments.

Still referring to FIG. 3, sensor hub and low-power AI device 307 may include an always-on, low-power core configured to execute small neural networks and specific applications, such as contextual awareness and other enhancements. In some embodiments, sensor hub and low-power AI device 307 may be configured to operate as orchestrator 501A (FIG. 6).

High-performance AI device 308 is a significantly more powerful processing device than sensor hub and low-power AI device 307, and it may be designed to execute multiple complex AI algorithms and models concurrently (e.g., Natural Language Processing, speech recognition, speech-to-text transcription, video processing, gesture recognition, user engagement determinations, etc.).

For example, high-performance AI device 308 may include a Neural Processing Unit (NPU), Tensor Processing Unit (TSU), Neural Network Processor (NNP), or Intelligence Processing Unit (IPU), and it may be designed specifically for AI and Machine Learning (ML), which speeds up the processing of AI/ML tasks while also freeing host processor 201 to perform other tasks.

Display/graphics device 309 may be designed specifically to perform video enhancement operations. In operation, display/graphics device 309 may provide a video signal to an external display coupled to IHS 200 (e.g., display device(s) 211).

Camera device 310 includes an Image Signal Processor (ISP) configured to receive and process video frames captured by a camera coupled to platform 300 (e.g., in the visible and/or infrared spectrum).

Video Processing Unit (VPU) 311 is a device designed to perform hardware video encoding and decoding operations, thus accelerating the operation of camera 310 and display/graphics device 309. For example, VPU 311 may be configured to provide optimized communications with camera device 310 for performance improvements.

In some cases, devices 309-311 may be coupled to interconnect 303 via a secondary interconnect. A secondary interconnect may include any bus suitable for inter-device and/or inter-bus communications within an SoC.

Security device 312 includes any suitable security device, such as a dedicated security processor, a Trusted Platform Module (TPM), a TRUSTZONE device, a PLUTON processor, or the like. In various implementations, security device 312 may be used to perform cryptography operations (e.g., generation of key pairs, validation of digital certificates, etc.) and/or it may serve as a hardware root-of-trust (RoT) for heterogenous computing platform 300 and/or IHS 200.

Wireless controller, network adapter, and/or modem 313 is a device designed to enable all wired and wireless communications in any suitable frequency band (e.g., BT, WiFi, 5G, etc.), subject to AI-powered optimizations/customizations for improved speeds, reliability, and/or coverage.

Peripherals 314 may include all other devices coupled to platform 300 through mechanisms other than PCIe controller 305. In some cases, peripherals 314 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 200.

In some cases, devices 312 and/or 313 may be coupled to interconnect 303 via the same secondary interconnect serving devices 309-311. Additionally, or alternatively, devices 312 and/or 313 may be coupled to interconnect 303 via another secondary interconnect.

EC/BMC 209 is designed to enable management operations of IHS 200, similarly as described with respect to FIG. 2, but here integrated into platform 300, as another SoC device. Unlike other devices in platform 300, however, EC/BMC 209 may be operational from the very start of each SoC power reset, before other devices such as CPU clusters 301A-N or sensor hub and low-power AI device 307 are fully running or powered on.

EC/BMC 209 may also provide an out-of-band (OOB) channel that serves as management channel 104 of FIG. 1. In some cases, EC/BMC 209 may be external to SoC platform 300 and coupled thereto via a high-speed interface (e.g., enhanced SPI or "eSPI"). In other cases, EC/BMC 209 may be configured to operate as orchestrator 501A (FIG. 6).

In various implementations, fan controller 315 may be used to operate fan(s) 217. For example, fan controller 315 may be provided to regulate the speed of the fan(s) 217.

Fan controller 315 may receive periodic sensor readings from one or more sensors of the chassis 104 and dynamically adjust the speed of fan(s) 217 using a proportional-integral-derivative (PID) controller algorithm that is fed with sensor data such as, for example: outlet ambient temperature, CPU temperature, Dual In-line Memory Module or "DIMM" temperature, IHS power consumption, etc.

In case of sensor or fan controller failure, fan(s) 217 may be configured to operate at their maximum speed. Additionally, or alternatively, EC/BMC 209 or other platform device (e.g., sensor hub and low-power AI device 307) may send control signals to fan controller 315 to operate fan(s) 217.

In various embodiments, one or more devices of heterogeneous computing platform 300 (e.g., GPU 304, aDSP 306, sensor hub and low-power AI device 307, high-performance AI device 308 VPU 311, etc.) may be configured to execute one or more AI model(s), simulation(s), and/or inference(s).

Applications 412-414 (and/or host OS 400 components) may use AI models executed by devices within platform 300 for various reasons, ranging from video/audio processing to system optimization tasks. Additionally, or alternatively, ITDMs/OEMs may direct a selected device within platform 300 to act as orchestrator 501A (FIG. 6) and to execute AI models that enable various IHS management or configuration operations.

Figure 4:
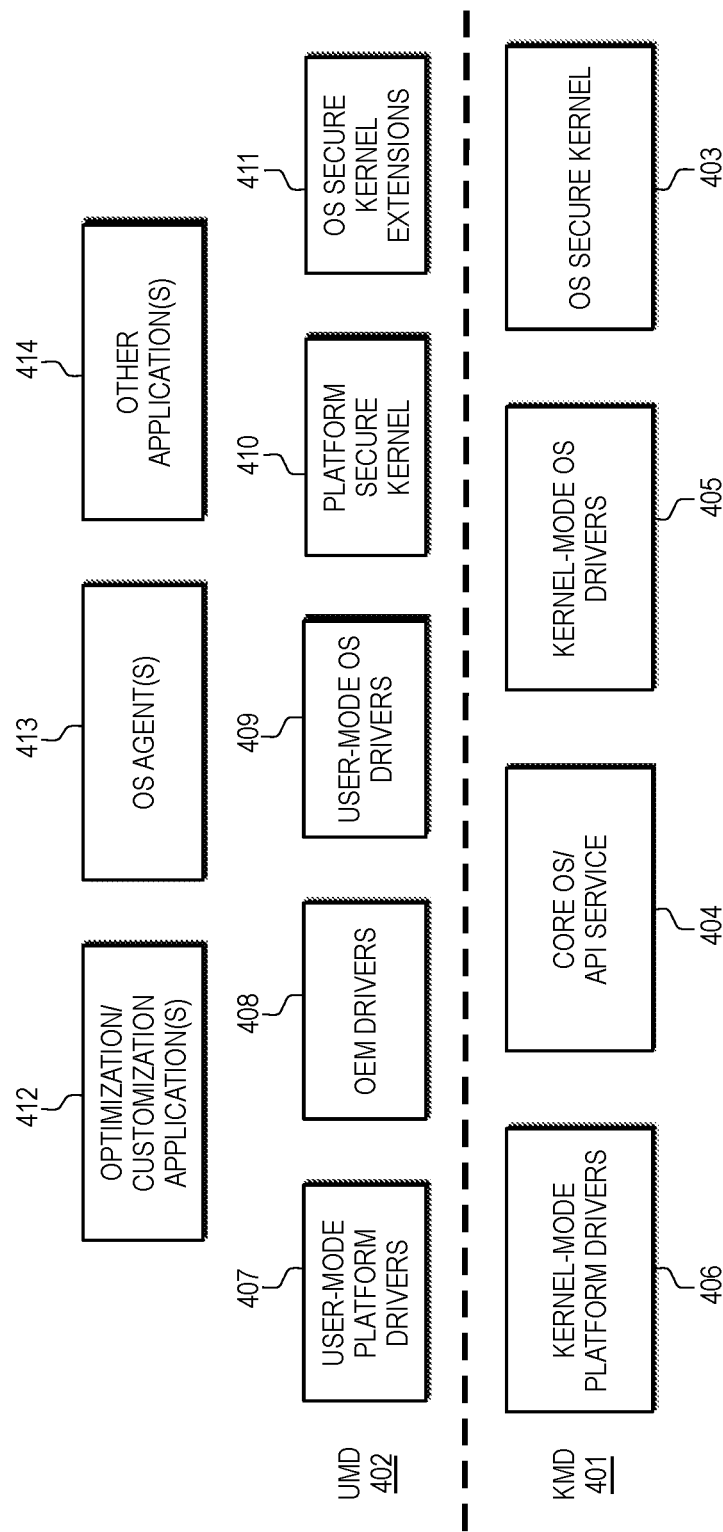
FIG. 4 is a diagram illustrating an example of a host Operating System (OS) executable by a heterogenous computing platform, according to some embodiments.

FIG. 4 is a diagram illustrating an example of host OS 400 executable by CPU clusters 301A-N of heterogenous computing platform 300. In some cases, host OS 400 may be implemented as WINDOWS on ARM. As shown, the stack of host OS 400 includes kernel mode drivers (KMD) in kernel space 401 below and user mode drivers (UMD) in user space 402 above.

In kernel space 401, OS secure kernel 403 is responsible for secure operations (e.g., encryption, validation, etc.) within IHS 200. Core OS/API service 404 has direct access to processing component(s) of IHS 200 such as, for example, heterogenous computing platform 300. OS drivers 405 include kernel mode drivers developed by the OS publisher or other developer. Platform drivers 406 include kernel mode drivers developed by the manufacturer of heterogenous computing platform 300, for example, for use with devices 301-315.

In user space 402, user-mode platform drivers and services 407 enable access to features provided by devices 301-315 through kernel-mode platform drivers 406. OEM drivers 408 enable features in OEM devices coupled to IHS 200, and user-mode OS drivers and services 409 enable access to OS features through kernel mode OS drivers 405. Platform secure kernel 410 includes protected user-mode portions of host OS 400 developed by the manufacturer of heterogenous computing platform 300, and OS secure kernel extensions 411 include extensions to protected user-mode portions of host OS 400 developed by the OS publisher or other developer.

OS agent(s) 413 may include an OS agent or client configured to communicate with service(s) provided by ITDM/OEM server 102 to establish management channel 104. Moreover, other application(s) 414 may include or be a part of any workload executable by heterogenous computing platform 300. For example, other application(s) 414 may include productivity, collaboration, streaming, multimedia, or gaming applications executable by host OS 400.

Optimization/customization application(s) 412 may include any host OS 400—level application configured to intelligently optimize the performance of IHS 200 (e.g., DELL OPTIMIZER), for example, by using AI models to dynamically configure IHS 200's settings and/or to optimize the performance of other applications 414. In operation, optimization/customization application(s) 412 may improve the productivity, performance, and user experience through system usage analysis and learning. For example, optimization/customization application(s) 412 may be invoked, within host OS 400, to learn how a selected application 414 is used. Optimization/customization application(s) 412 may identify optimization opportunities, classify users, and automatically apply appropriate settings (e.g., storage, memory, and/or CPU) to improve a selected application 414's performance.

At least one of applications 412-414 may be configured to utilize one or more devices, features, or services exposed, surfaced, enumerated, or otherwise made available by user-mode drivers 407-409, for example, through a Human Interface Device (HID) interface and/or an HID report provided by host OS 400, or the like. In some cases, one or more of applications 412-414 may operate as orchestrator 501A (FIG. 6).

In various implementations, host OS 400 may be configured to receive a firmware installation package or executable file containing at least one extension driver (e.g., a setup information or "INF" text file in a driver package) from ITDM/OEM service(s) 102 via management channel 104. The installation package may be processed by a UEFI UpdateCapsule process when distributed as part of an OS update, as a system-wide and/or device-specific firmware update, and/or it may be distributed by OEM update applications such as DELL COMMAND UPDATE, integrated with remote deployment and update management tools.

Firmware components of each extension driver may be loaded, attached, or extended onto user-mode platform drivers and services 407, and may be communicated by user-mode platform drivers and services 407 to respective devices of heterogenous computing platform 300 through kernel-mode platform drivers 406 for installation, update, or execution of such firmware components in those devices.

As such, the deployment of extension drivers by host OS 400 as OEM drivers 408 provides value-added features or services to user-mode platform drivers (e.g., base drivers) 407 and/or applications 412-414. Particularly, OEM drivers 408 may expose custom services and routines provided by any one of devices 301-315 upon execution of their corresponding firmware components. In some cases, OEM driver 408 may also operate as orchestrator 501A (FIG. 6).

Figure 5:
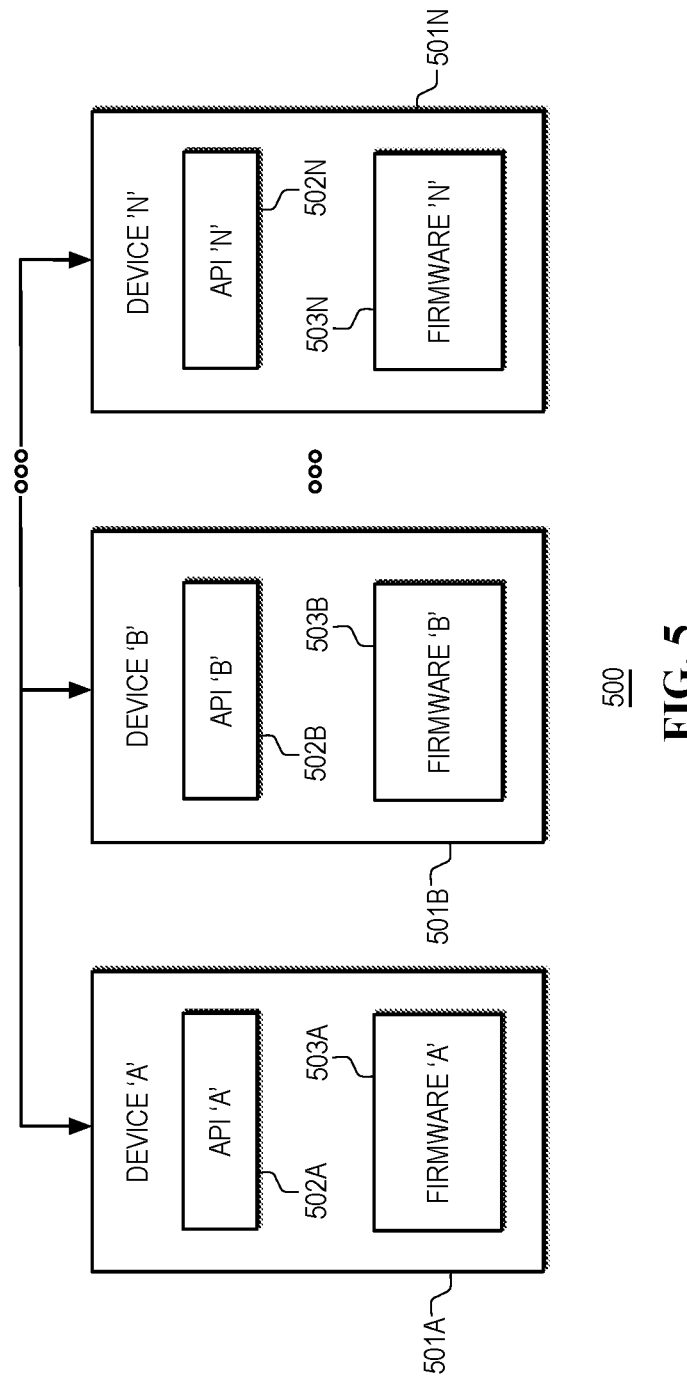
FIG. 5 is a diagram illustrating an example of host OS-independent, autonomous inter-device communications in a heterogenous computing platform, according to some embodiments.

FIG. 5 is a diagram illustrating an example of host OS-independent, autonomous inter-device communications 500 in heterogenous computing platform 300. Particularly, each of devices 501A-N may implement any of devices 301-315 of heterogenous computing platform 300.

Each of APIs 502A-N provides access to firmware 503A-N executed by a corresponding device 501A-N. In operation, each firmware component 503A-N may exchange data and commands directly with each other using APIs 502A-N. Through APIs 502A-N, one or more of devices 501A-N may be configured to enable, disable, or modify firmware services provided by other devices 503A-N. For example, in some embodiments, one or more of devices 501A-N may be designated as orchestrator 501A (FIG. 6) upon booting of platform 300.

In various embodiments, firmware services resulting from the execution of firmware 503A-N may be provided by their respective device 501A-N to other devices 501A-N within heterogeneous computing platform 300 autonomously and/or independently of the operation of host OS 400. Communications between executing firmware 503A-N and applications 412-414 may take place through OEM drivers 408. In some cases, executing firmware 503A-N may be identified by or exposed to host OS 400 and/or applications 412-414 as part of HID reports.

Firmware services 601A-N and corresponding OEM drivers 408 may be installed, modified, updated, and/or removed from IHS 200 upon each installation of a firmware installation package for the entire heterogenous computing platform 300, for example, at each boot of IHS 200. For example, each firmware component 503A-N providing a respective firmware service 601A-N may be delivered to a respective device 501A-N as an extension driver. Upon execution, firmware services 601A-N may provide additional controls over the management, deployment, customization, and/or configuration of IHS 200 to the ITDM or OEM that are independent of updates to host OS 400 and/or applications 412-414.

In other embodiments, any given one of devices 501A-N may be rebooted or reset independently of the other devices to perform a local installation, update, or modification of that given device's firmware services 601A-N without having to reboot the entire heterogenous computing platform 300 and/or IHS 200. Additionally, or alternatively, one or more of devices 501A-N may have its firmware service 601A-N at least partially installed or updated without rebooting or resetting the device.

FIG. 6 is a diagram illustrating an example of orchestration system 600 where orchestrator 501A (e.g., any of devices 301-315 assigned to operate as such) is configured to manage other devices 501B-N (e.g., other devices 301-315) of heterogenous computing platform 300 of IHS 200. In some embodiments, orchestrator 501A may be implemented as one of applications 412-414, one of OEM drivers 408, sensor hub and low-power AI device 307 and/or its firmware service(s), EC/BMC 209 and/or its firmware service(s), or any combination thereof.

Orchestrator 501A may be configured to provide firmware service(s) 601A through the execution of firmware 503A. Similarly, each of devices 501B-N may be configured to provide their own firmware service(s) 601B-N through the execution of firmware 503B-N. Moreover, each of firmware services 601A-N may operate independently of host OS 400.

Firmware service(s) 601A of orchestrator 501A may be configured to facilitate the communication of data, commands, AI models, scripts, and/or routines among firmware services 601B-N of devices 601B-N via APIs 502B-N. Additionally, or alternatively, firmware services 601B-N may exchange data and commands with each other using APIs 502B-N.

For example, in some cases orchestrator 501A may be implemented by sensor hub and low-power AI device 307 and/or by EC/BMC 209. GPU 304 may execute firmware service 601B, high-performance AI device 308 may execute firmware service 601C, aDSP 306 may execute firmware service 601D, display 309 may execute firmware service 601E, and other devices 501F-N (e.g., modem 313, peripherals 314, etc.) may execute respective ones of firmware services 601F-N. Firmware services 601A-N may be performed through the execution of firmware components 503A-N previously distributed as extension drivers in a heterogenous computing platform 300—wide firmware installation package.

Orchestrator 501A may be configured to operate a plurality of devices 501B-N and to receive context/telemetry data therefrom. In this manner, orchestrator 501A may be configured to enable IHS users, ITDMs, and/or OEMs to manage, deploy, customize, and/or configure IHS 200 and/or applications 412-414, for example, based upon contextual or telemetry-based rules.

In various embodiments, systems and methods described herein may enable an ITDM or OEM to manage, deploy, customize, and/or configure aspects of IHS 200 through orchestrator 501A. For example, ITDM/OEM service(s) 102 may provide one or more devices 501A-N of heterogeneous computing platform 300 with firmware components 503A-N that, upon execution by their respective devices, add, remove, or modify services accessible to one or more application(s) 412-414 based upon context/telemetry data.

Particularly, orchestrator 501A may receive message(s), file(s), command(s), script(s), and/or ITDM/OEM management polic(ies) 602 (e.g., an Extensible Markup Language or "XML", a JavaScript Object Notation or "JSON" file, etc.) from ITDM/OEM service(s) 102 via OS agent(s) 413 (i.e., in-band).

When management channel 104 is an OOB channel between EC/BMC 209 and ITDM/OEM service(s) 102, OS agent(s) 413 may be replaced with EC/BMC 209.

In some cases, along with polic(ies) 602, OS agent(s) 413 may also receive one or more AI models and/or AI model parameters for use by a device within platform 300, such as high-performance AI device 308 and/or sensor hub and low-power AI device 307. AI models and/or parameters may be provided to OS agent(s) 413 by ITDM/OEM service(s) 102 or by third-party service(s) 105.

Polic(ies) 602 may contain commands, program instructions, routines, and/or rules that conform to APIs 502A-N. Alternatively, or alternatively, orchestrator 501A may interpret polic(ies) 602 and issue commands conforming to APIs 502A-N. Using APIs 502B-N, orchestrator 501A may be configured to enable, disable, or modify firmware services 601B-N based upon instructions conveyed in polic(ies) 602 (e.g., in response to changes in context, telemetry, etc.) without the involvement of host OS 400.

For example, based upon polic(ies) 602, orchestrator 501A may install, update, modify, enable or disable any of firmware services 601A-N in each of devices 501A-N in response to the detection of one or more of: an IHS location, an IHS posture (e.g., lid closed, etc.), an IHS identification (e.g., service tag, serial number, etc.), a type of IHS (e.g., manufacturer, model, etc.), an identification or type of heterogenous computing platform 300, an IHS battery (dis)charge level or rate, an identity or type of connected or available IHS peripherals, a security posture of IHS 200 (e.g., connected to VPN, disposed in a trusted or secure location, etc.), an identity or type of applications 412-414 executed by host OS 400, an identity or type of one of applications 412-414 requesting firmware services 601A-N (e.g., via OEM driver 408), an identification of a user of the IHS, an identification of a user group or role, a user's proximity to the IHS, a user's level of user engagement, detected onlooker(s), a user's personal information (e.g., languages spoken, video or audio preferences, etc.), calendar events or data (e.g., type, time, and duration of a collaboration session, priority or importance of the session, role of the user in the session, recurring status, identities and roles of other participants in the session, etc.), messaging (e.g., email, text messages, etc.) data (e.g., subject, date sent and received, number of related messages, priority, names and roles of addressees, etc.), environmental conditions (e.g., weather, background noise levels, lighting level or quality, etc.), etc.

In some cases, polic(ies) 602 may specify that orchestrator 501A select one or more of a plurality of different AI models (or different instances of the same AI model) to be used for a given operation in response to the IHS being at a certain geographic location, network location, type of audio environment, etc. Any of the contextual and/or telemetry information described herein may be used to create different sets of conditions for rules outlined in polic(ies) 602.

For example, polic(ies) 602 may specify that high-performance AI device 308 be used to apply a more computationally costly AI model (or a larger number of models) under a favorable set of conditions (e.g., if battery level is above a first threshold level, if IHS 200 is connected to AC power, if a certain application or type of application is in execution, if a level of utilization of high-performance AI device 308 and/or sensor hub and low-power AI device 307 is below a threshold level, etc.). Under a set of less favorable conditions (e.g., if battery level is below a second threshold level, if a certain application or type of application is not in execution, if a level of utilization of high-performance AI device 308 is above a threshold level, etc.), however, polic(ies) 602 may specify that sensor hub and low-power AI device 307 be used to apply a less computationally costly AI model (or fewer models).

In some cases, polic(ies) 602 may also determine whether or under what conditions the user many manually override its rules and settings (e.g., turn a camera or microphone on or off, enable or disable a filter or effect, etc.). Moreover, for different types of users (e.g., engineer, customer support, executive, etc.) who tend to interact with their IHSs 101A-N in different ways, ITDM/OEM service(s) 102 may deploy different rules, AI models, and/or parameters by selecting and deploying different polic(ies) 602.

Figure 7:
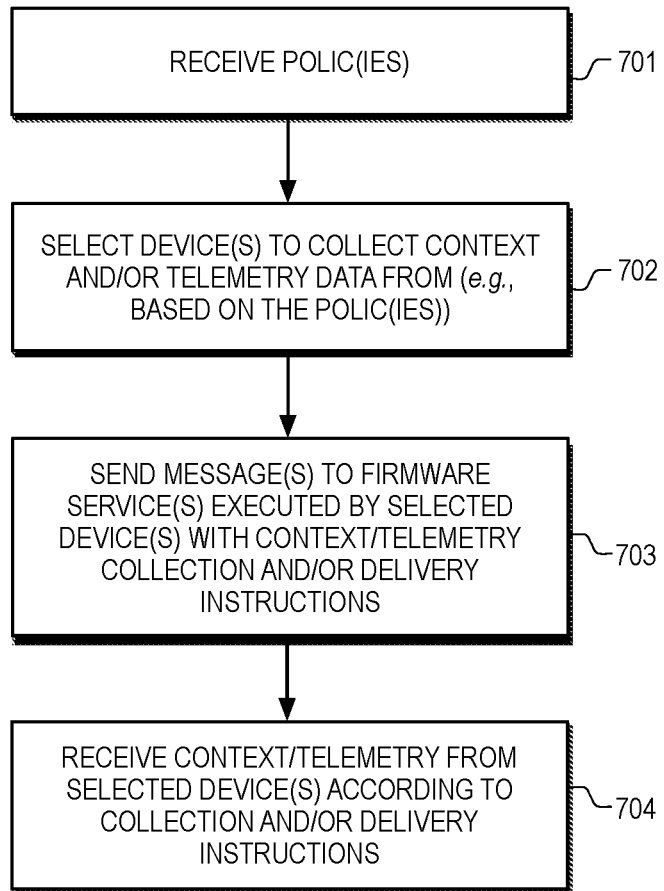
FIG. 7 is a flowchart illustrating an example of a method for collection and management of context and telemetry data in a heterogenous computing platform, according to some embodiments.

In many scenarios, systems and methods described herein may enable the collection and management of context/telemetry data from one or more of devices 501A-N, host OS 400, and/or applications 412-414. In that regard, FIG. 7 shows a flowchart illustrating an example of method 700 for the collection and management of context/telemetry data in heterogenous computing platform 300. In various embodiments, method 700 may be performed, at least in part, by firmware service 601A of orchestrator 501A.

At 701, orchestrator 501A may receive polic(ies) 602. Polic(ies) 602 may be selected by ITDM/OEM service 102 (e.g., based upon the identities of IHSs 101A-N, service tags, network addresses, user IDs, etc.) and may include rules and/or parameters usable by orchestrator 501A to manage context/telemetry data collection operations autonomously and/or independently of host OS 400. For example, polic(ies) 602 may identify one or more of: context/telemetry data to be collected, devices to collect the context/telemetry data from, context/telemetry data collection parameters (e.g., collection frequency or sampling rate, collection start and end times, a duration of the collection, a maximum amount of telemetry data to be collected, etc.), context/telemetry data collection routines, scripts, and algorithms to process and/or produce the context/telemetry data, etc. In some cases, each individual piece or set of context/telemetry data may include a common clock time stamp (e.g., if requested by polic(ies) 602).

At 702, orchestrator 501A may select one or more devices (e.g., among devices 301-315 of heterogeneous computing platform 300) to collect context/telemetry data from, based upon polic(ies) 602. In some cases, selected devices may be dynamically chosen by orchestrator 501A based upon previously collected context/telemetry data, as also outlined in polic(ies) 602.

At 703, firmware service(s) 601A of orchestrator 501A may send message(s) to one or more of firmware services 601B-N of selected devices 501A-B with instructions about how to collect any identified context/telemetry data and/or how to deliver the collected context/telemetry data. For example, such message(s) may inform a given context/telemetry collection device which other device(s) to deliver the collected data to, acceptable data format(s) or protocol(s), the manner and/or frequency of data delivery, etc. Moreover, these message(s) may be transmitted between firmware services(s) 601A-N without any involvement by host OS 400.

Firmware service(s) 601A may transmit context/telemetry collection messages to any given one of firmware service(s) 601B-N executed by devices 501B-N using a respective one of APIs 502A-N. Conversely, firmware service(s) 601B-N of devices 501B-N may send messages (e.g., acknowledgement, device status, context/telemetry data collected, etc.) to firmware service(s) 601A orchestrator 501A using API 502A, again without any involvement by host OS 400. Then, at 704, firmware service(s) 601A of orchestrator 501A receives context/telemetry data from the selected devices 501B-N following API 502A.

In various implementations, the collected context/telemetry data may be used by orchestrator 501A to enforce a wide variety of management decisions based upon polic(ies) 602. Additionally, or alternatively, the collected context/telemetry data may be input into AI model(s) executed by device(s) 501A-N.

In some cases, method 700 may be performed at the request of applications 412-414. By maintaining all context/telemetry collection routines in firmware 503A-N, method 700 addresses concerns associated with the excessive consumption of IHS resources by OS-level telemetry collection software. When orchestrator 501A serves as the only point of contact for all context/telemetry requests targeting devices 501A-N, it may output a stream of context/telemetry data to host OS 400.

Figure 8:
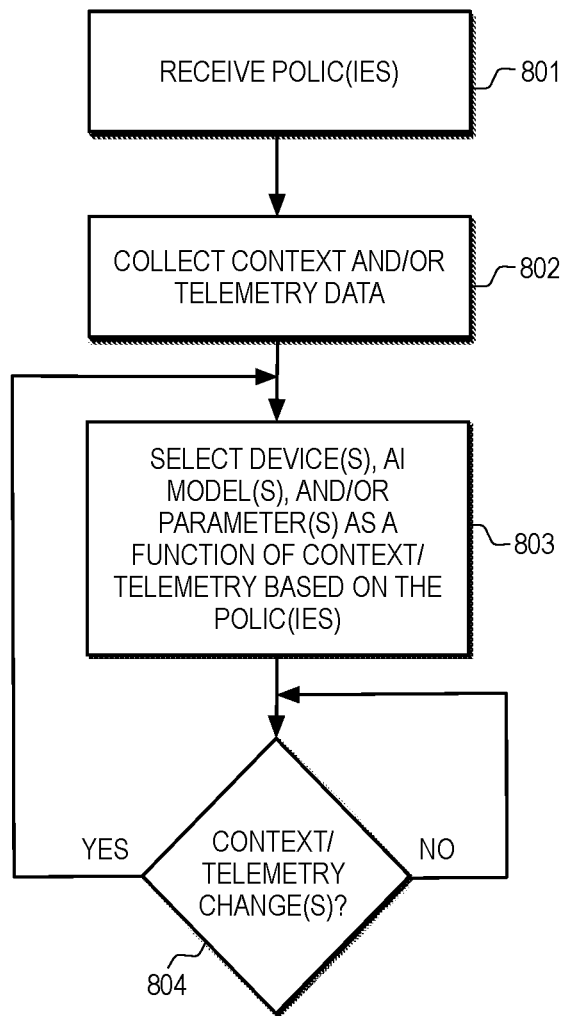
FIG. 8 is a flowchart illustrating an example of a method for deploying an Artificial Intelligence (AI) model in a heterogenous computing platform based, at least in part, upon ITDM/OEM management polic(ies), according to some embodiments.

FIG. 8 is a flowchart illustrating an example of method 800 for deploying AI models in heterogenous computing platform 300 based, at least in part, upon ITDM/OEM management polic(ies) 602. In various embodiments, method 800 may be performed, at least in part, by firmware service 601A of orchestrator 501A.

At 801, orchestrator 501A may receive polic(ies) 602 selected by ITDM/OEM service 102 (e.g., based upon the identities of IHSs 101A-N). At 802, orchestrator 501A may initiate and/or manage context/telemetry data collection operations autonomously and/or independently of host OS 400, as shown in method 700 (FIG. 7).

At 803, orchestrator 501A uses at least a subset of context/telemetry information—and/or it uses AI mode inferences produced based upon the subset of context/telemetry information—to enforce the execution of AI models following rules indicated ITDM/OEM polic(ies) 602. In that regard, it should be noted that an ITDM/OEM may set use polic(ies) 602 to enforce unique rules, triggers, and/or thresholds for selecting AI processing settings for different ones of IHSs 101A-N (or groups of IHSs) with different levels of granularity, based on context/telemetry data.

For example, at 803, orchestrator 501A may enforce a policy rule which dictates that a particular device within heterogeneous computing platform 300 be selected to execute a specific AI model (or type of AI model) with certain parameter(s) in response to different context/telemetry data, such as, for example: when an IHS is on battery power (or when the battery charge drops below or rises above a minimum value), when the IHS 200 is in a certain location (e.g., at work, at home, within a distance from selected coordinates, etc.), based on hardware utilization (e.g., a level of utilization of one or more of the devices in platform 300 reaches a maximum or minimum value), if the user of IHS 200 belongs to a selected group of users (e.g., "managers," "engineers," etc.), when IHS 200 is manipulated into a given posture, when the user is present or within a selected distance from IHS 200, etc.

At 804, orchestrator 501A may determine if there are any context/telemetry data changes (e.g., if the latest data has a value different than a previously collected data value by an amount greater than or equal to a threshold value). If not, control stays with 804. If so, control returns to 803, where orchestrator 501A may select different device(s), AI model(s), and/or parameter(s) to initiate new AI processes or give continuance to ongoing AI processes (e.g., AI model migration).

As such, method 800 provides a mechanism for orchestrator 501A to dynamically modify the provisioning of AI services by heterogeneous computing platform 300 autonomously and/or independently of host OS 400.

In various embodiments, systems and methods described herein may employ various aspects of heterogeneous computing platform 300 to manage thermal, power, performance, and acoustic characteristics of IHS 200. For example, these systems and methos may be used to implement passive and active cooling techniques with a focus context, telemetry, and usage priorities (e.g., gaming, performance, etc.).

Figure 9:
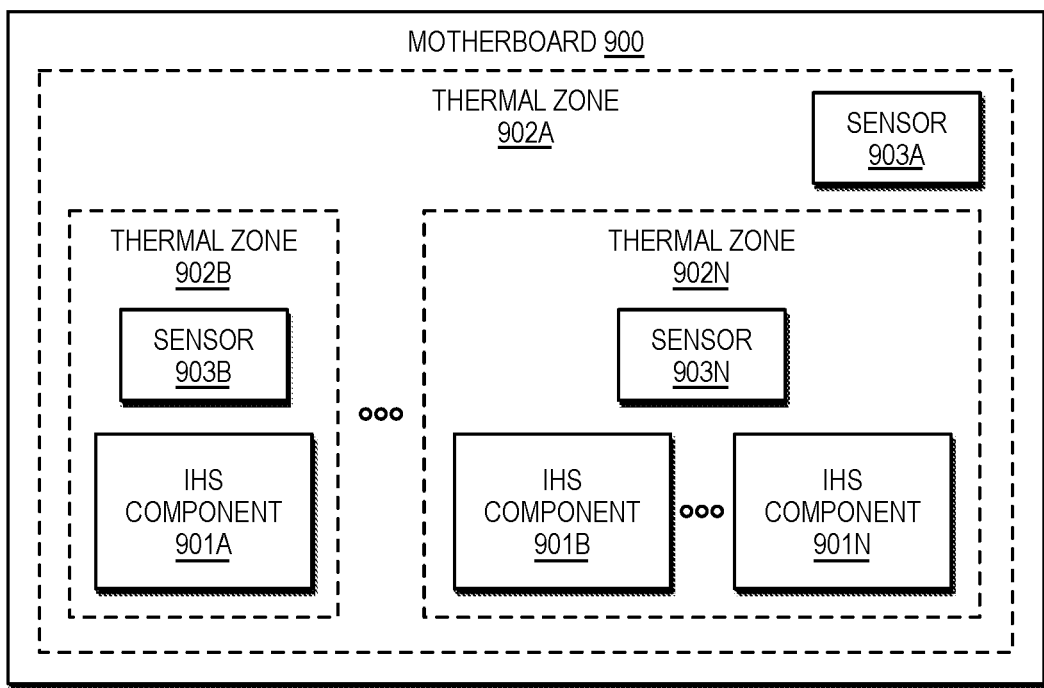
FIG. 9 is a diagram illustrating an example of an IHS with multiple thermal zones, according to some embodiments.

In that regard, FIG. 9 is a diagram illustrating an example of motherboard 900 of IHS 200 having multiple thermal zones 902A-N defined therein. As used herein, the term "thermal zone" relates to a selected area of IHS 200 that has an associated temperature value. In various implementations, thermal zones may include Advanced Configuration and Power Interface (ACPI) thermal zones.

Ordinarily, IHS 200 may be configured to monitor the temperature value provided by a temperature or electrical current sensor 903A-N in each thermal zone 902A-N and to: (a) apply one or more thermal mitigation actions to heat-producing components 910A-N (e.g., host processor(s) 201, GPU 204, PSU 215, heterogeneous computing platform 300, etc.) within its respective zone(s), such as, for example, by modifying a component's performance (e.g., its frequency or speed of operation), and/or (b) adjust the operation of an active cooling system, such as fan(s) 217.

In general, any number of thermal zones 902A-N may be defined within IHS 200, and each zone 902A-N may include any number of components 901A-N, as well as its own sensor 903A-N. In some cases, two or more components (e.g., 901B and 901N) may be part of the same thermal zone (e.g., 902N). Additionally, or alternatively, a single component (e.g., 901A) may be included in two or more thermal zones (e.g., thermal zones 902A and 902B) at the same time.

In some implementations, at least one thermal zone is defined to implement a critical shutdown temperature (and hibernate temperature, if supported). Additionally, or alternatively, thermal zones may be defined to monitor specific devices or skin temperature for mitigation.

Figure 10:
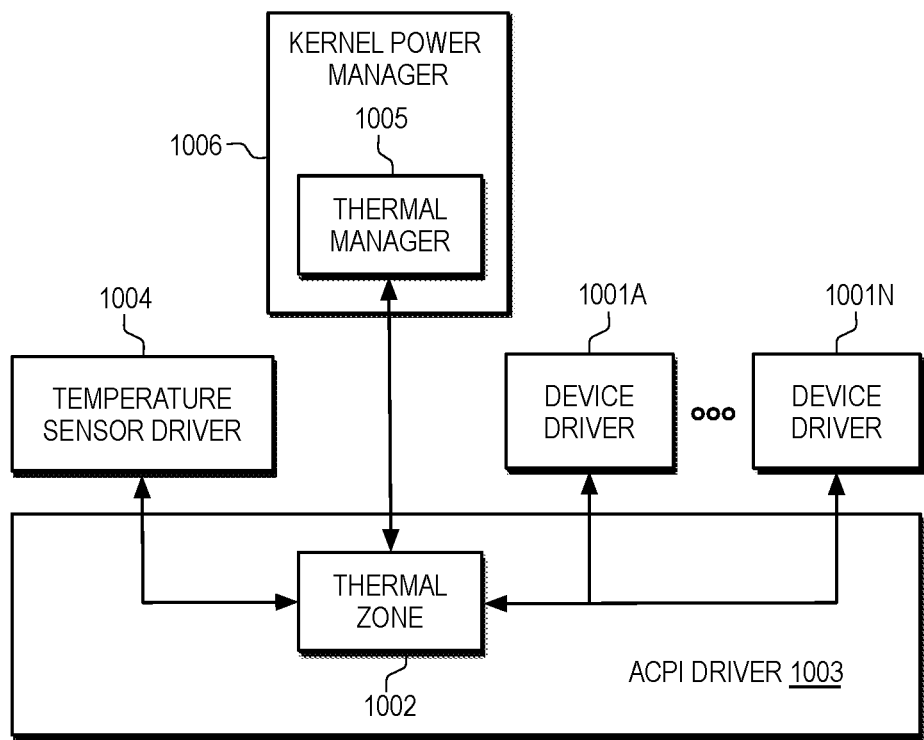
FIG. 10 is a diagram illustrating an example of a thermal management architecture in an IHS, according to some embodiments.

FIG. 10 is a diagram illustrating an example of thermal management architecture 1000 in IHS 200. As illustrated, thermal zone definition 1002 may be described to host OS 400 via firmware as part of ACPI driver 1003. Meanwhile, temperature sensor driver 1004 is configured to sense the temperature of thermal zone 1002. In some cases, temperature sensor driver 1004 may implement an ACPI 'Read Temperature' interface to retrieve the temperature of a zone.

Device drivers 1001A-N include kernel mode drivers that provide a thermal cooling interface configured to implement, in each respective IHS component 901A-N (FIG. 9), one or more passive cooling actions (e.g., throttling behaviors, etc.).

Thermal manager 1005 within kernel power manager 1006 may orchestrate cooling efforts in IHS 200 by interpreting thermal zone definition 1002 and invoking the proper interfaces at the required times. In some implementations, thermal manager 1005 may be part of the host OS 400's kernel.

In operation, thermal zone is described in firmware and exposed to thermal manager 1005 through ACPI. In this manner, thermal manager 1005 may determine how many thermal zones need to be managed, when to start throttling each thermal zone, and/or which IHS components are a part of each thermal zone.

When thermal manager 1005 is notified of a thermal event by temperature sensor driver 1004 of thermal zone 1002, for example, it may start to periodically evaluate the temperature of that zone, and it may determine a thermal throttling performance percentage to apply to one or more IHS components therein. In some cases, such an evaluation may use thermal throttling algorithms outlined in the ACPI specification.

Thermal manager 1005 may then notify all device drivers 1001A-N in zone 1002 to throttle performance by a specific percentage, and device drivers 1001A-N may translate the throttling hint to a device-class-specific action to reduce the IHS component's performance; that is, each device driver registered as a thermal throttling device receives a thermal throttling percentage request and translates that percentage to an action that makes sense for itself. Such periodic evaluation and throttling may be stopped when temperature sensor driver 1004 reports a temperature below the throttling threshold temperature, and throttling is no longer required.

In some cases, device drivers 1001A-N may be configured to map the provided thermal limit to its specific cooling IHS component characteristics and to implement appropriate cooling mitigations. If a same IHS component appears in multiple thermal zones, the thermal limit that constrains the IHS component the most (that is, the lowest percentage) may be passed to its corresponding device driver.

For example, when a device driver 1001A-N is for a processing core (e.g., in host processor 201 or any device 301-315 equipped with its own processing cores), thermal manager 1005 may communicate the thermal throttling percentage to a Processor Power Manager (PPM) within host OS 400, which allows core parking and processor idling as additional thermal mitigation possibilities.

For display backlight control, thermal manager 1005 may communicate the thermal throttling percentage to the monitor driver (e.g., monitor.sys), which in turn decides the actual backlight level setting based upon this thermal input.

With respect to battery charging, yet another device driver (e.g., cmbatt.sys) may take the current thermal limit into account during charging operations.

Similarly, a network driver may receive the thermal hints from thermal manager 1005 and apply its own performance reduction strategies to reduce the heat produced by network cards and wireless adaptors.

Figure 11:
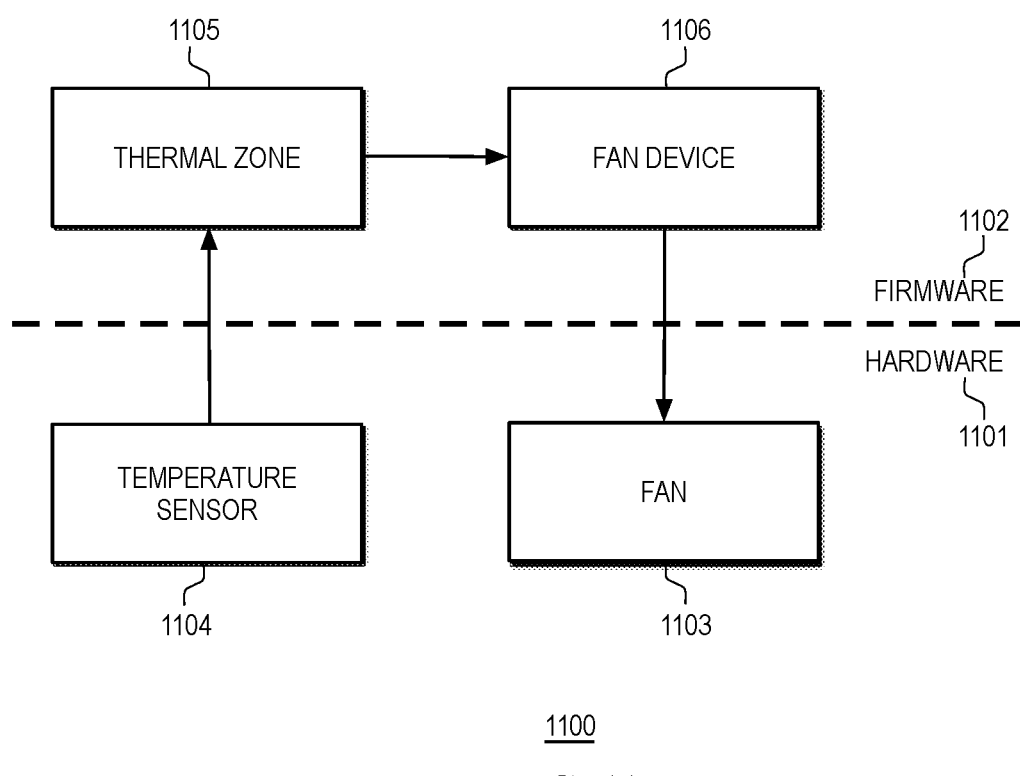
FIG. 11 is a diagram illustrating an example of an active cooling system, according to some embodiments.

FIG. 11 is a diagram illustrating an example of active cooling system 1100 in IHS 200. In operation, temperature sensor 1104 (e.g., among sensor(s) 210) in hardware layer 1101 (e.g., via EC/BMC 209) may read a temperature that crosses a selected trip point and, in response, it may notify thermal zone 1105 in firmware layer 1102 (e.g., ACPI).

Thermal zone 1105 may receive the notification, and it may compare a temperature reading included in the notification to an active trip point associated with zone 1105 to determine whether fan(s) 217 should be on, off, and/or at a particular speed.

In response, thermal zone 1105 may send a command to fan device 1106 (e.g., one of device drivers 1001A-N), which in turn applies fan settings to fan hardware 1103 (e.g., fan controller 315), thus effectively controlling the speed of fan(s) 217.

In some cases, once fan(s) 217 are turned on, another IHS component such as EC/BMC 209, for example, may take over their operation using its own algorithm.

Figure 12:
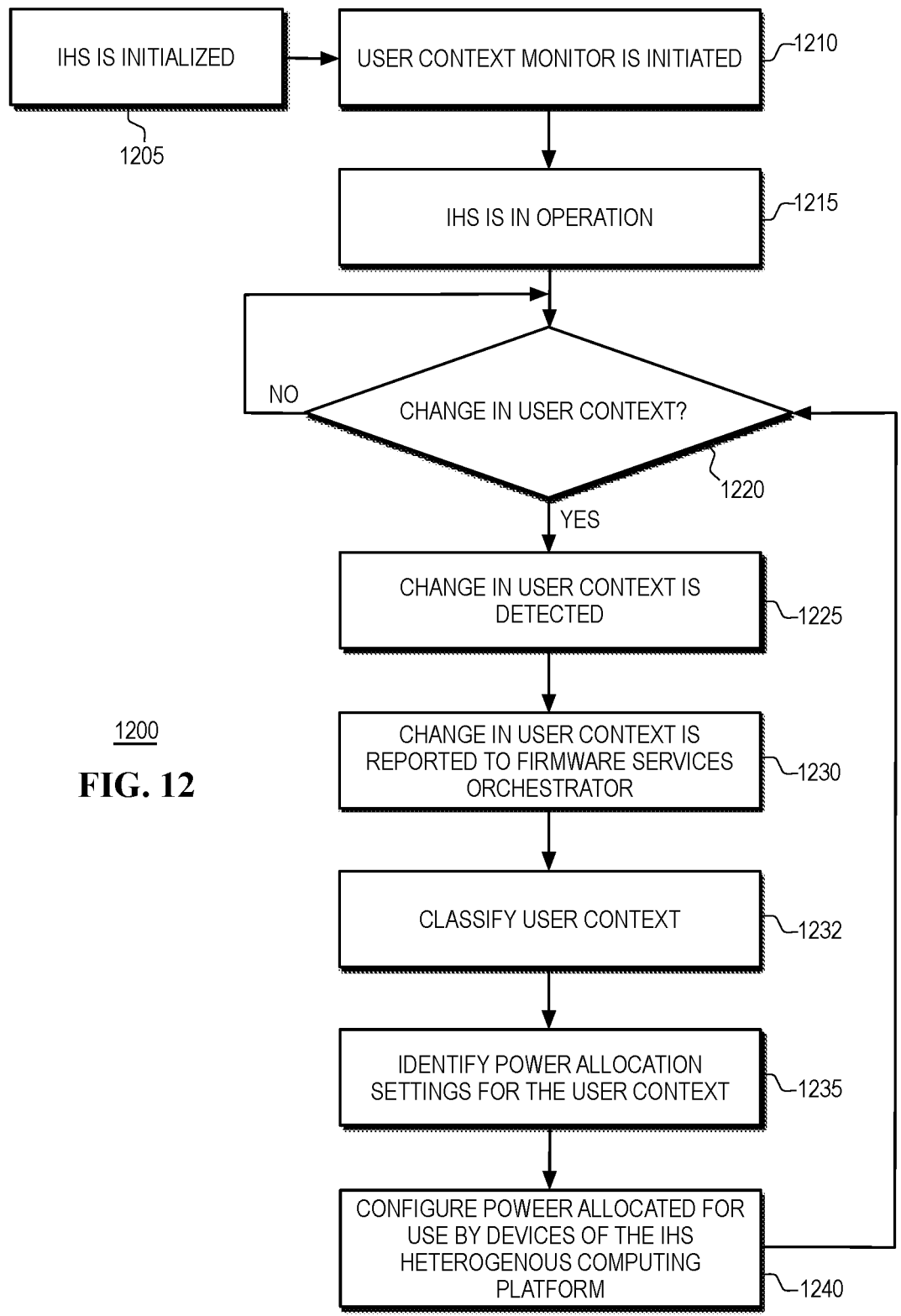
FIG. 12 is a flowchart illustrating an example of a method for management of power allocations for components of a heterogeneous computing platform of an IHS.

FIG. 12 is a flowchart illustrating an example of a method management of power allocations for components of a heterogeneous computing platform of an IHS based on changes in the context of a user's operation of the IHS. Some embodiments may begin, at 1205, with the initialization of an IHS, such as the IHS 200 of FIG. 2, that includes a heterogenous computing platform, such as described with regard to the computing platform 300 of FIG. 3. As described, upon initialization of an IHS, instructions to be loaded for use by hardware components of the IHS, such as firmware and other settings, may be validated as authentic based on comparisons of the instructions to be loaded against reference signatures corresponding to authentic instructions. Upon successful validation of such instructions, each of the devices of the heterogenous computing platform of the IHS loads the validated instructions and operates based on execution of these trusted instructions.

In embodiments, this validated firmware to be loaded by devices of the heterogenous computing platform may include firmware that implements procedures for reporting power, performance and thermal characteristics of these devices for use by embodiments in managing power allocations between these devices. In these embodiments, the firmware loaded for operation by the devices of the heterogenous computing platform also includes an API by which capabilities of the devices may be configured in order to adapt the thermal operations of the devices to changes in the context of the user's operation of the IHS and/or to maintain operation of the IHS within specified thermal constraints, such as operating in a quiet mode or in a cool mode. Once firmware instructions for use by the devices of the heterogeneous computing platform have been validated, further initialization of the IHS may include loading operating system instructions, such as operating system 400 of FIG. 4, that includes user space 402 and kernel space 401 applications.

Once a requisite amount of instructions have been loaded and the IHS is in operation, at 1210, embodiments may initiate operation of a user context monitoring process on the IHS. In some instances, the user context monitor may be initiated as a background process that tracks various indications of active operation of the IHS by a user. In some embodiments, the user context monitoring process may be implemented using the sensor hub and low-power AI device of the heterogeneous computing platform, such as described with regard to FIG. 3. As described, a heterogeneous computing platform according to embodiments may implement procedures for determining a user's physical presence with respect to an IHS, such as using machine learning models that infer the presence of the user in close proximity to the IHS based on information "hints" that are collected by cameras, other sensors of the IHS and/or user input devices. For instance, using a camera and/or a time-of-flight sensors of an IHS, a sensor hub of the IHS may determine the user is in close proximity to the IHS. In some embodiments, facial recognition techniques may be utilized to infer, and in some instance to authenticate, the presence of the user in close proximity to the IHS.

In some embodiments, various devices of a heterogeneous computing platform may be configured to operate according to thermal constraints. For instance, an IHS may support configurations by which an IHS may operate in a cool mode in which temperatures on external surfaces of the IHS are regulated to remain below a threshold that allows comfortable use of the IHS by a user that is close contact with the IHS, such as a user operating a laptop computer or tablet device that is resting on the user's lap. In this same manner, an IHS may support thermal constraints that include a performance mode in which upper thresholds for internal and/or external temperatures of the IHS may be increased in order to support improved performance of the IHS, such as in operating processor cores of the IHS at higher frequencies and/or at longer intervals.

In some instances, an IHS may support a quiet mode thermal constraint that requires cooling of the IHS in a manner that maintains quiet operations by the IHS. Such settings allow the user to obtain the best performance that is possible while using restricted cooling procedures that generate levels of noise that are below a threshold noise level at which the IHS cooling operations are not audible (or at least barely audible) to an individual that is in close proximity to the IHS. In some instances, an IHS may support a balanced mode thermal constraint in which cooling capabilities, whether passive and/or active, are utilized such that upper limits on noise levels and outer surface temperatures of the IHS may be elevated sufficient to support certain amounts of high performance operations by the IHS, such as a predetermined rate and/or duration of bursts of high-power operations that can be supported within specified noise and thermal constraints. In some balanced modes, the thermal constraints do not restrict high performance operations of the IHS until temperatures and/or noise levels reach unacceptable levels, where these threshold of acceptable noise and/or heat may be tuned to the particular preferences of the user of the IHS.

In support of these capabilities, embodiments support operation of an IHS according to various thermal constraints, where thermal operations of the IHS may be configured based on user presence and engagement hints detected by various sensors of the IHS. In some embodiments, information collected by such sensors may be augmented by information collected from user input devices in order to improve user presence and/or engagement determinations. For example, in scenarios where collected sensor data indicates the user is not in proximity to the IHS, but this determination is made with limited confidence, embodiments may asses user inputs, or lack thereof, in order to bolster the determination that the user is not in proximity to the IHS, or at least not close enough to actively operate the IHS. For instance, embodiments may evaluate the lack of mouse and/or keyboard inputs by the user as indicators that the user's attention is not directed at the IHS. In this same manner, a determination that the attentiveness of the user relative to the IHS has waned, embodiments may augment the confidence in such a determination based on a user inputs, or lack thereof, detected by peripheral user input devices that are coupled to the IHS.

As described, collected sensor information may be utilized to infer a level of engagement with the IHS by the user. For example, in some embodiments, the sensor capabilities of the IHS may support retinal tracking, which may be utilized in detecting whether the user is looking at the display of the IHS. In some embodiments, information collected by camera and/or time-of-flight sensors may be utilized to determine whether the user's face is oriented towards the display of the IHS. In some embodiments, the collected information may also support determinations regarding likelihood the IHS is being utilized by a user based on the degree of orientation of the user's face relative to the IHS. For instance, the orientation of a user's head with a rotation of 45 degrees relative to the display monitor may be indicative of user inattentiveness, but with a likelihood that warrants evaluation of additional indicators of inattentiveness before initiating adjustments to the thermal operations of the IHS. However, detecting an orientation of a user's head with a rotation of 90 degrees or more relative to the display monitor may support a conclusive determination of inattentiveness by the user such that embodiments may immediately initiate adjustments to thermal operations of the IHS as described herein. In support of such user context monitoring capabilities, various components of the heterogeneous computing platform may implement capabilities for tracking different indicators of user attentiveness, which may then be provided to sensor hub, where the various indicators are collated in order to make a determination of the user's attentiveness. In this manner, a user context monitor of the heterogeneous computing platform may utilize available sensor capabilities to detect any changes in the user's proximity to the IHS, or other positioning relative to the IHS, in order to infer a context of the operation of the IHS, such as a level of a user attentiveness.

In embodiments, the user context monitor may also monitor user-level operations that are initiated through the various applications running on the IHS. As described, an IHS may support an operating system that provides a variety of interfaces for configuring the IHS and that supports a wide variety of user-level software applications. In addition, a user may initiate various types of operations supported by interfaces provided by an embedded controller that may implement a secure operating environment separate from the operating system of the IHS. Through use of such interfaces, a user may launch any number of software applications, and may also initiate a variety of operations in these applications. The user context monitor may implement procedures for detecting the launching of certain software applications by the user of the IHS, such as applications that are known to require significant processing resources. In addition, the user context monitor may additionally implement procedures for detecting certain events that are initiated by the user within software applications, where these events are known to require significant processing resources. For instance, within a gaming application, loading of a new game board by the user may require a significant and prolonged use of available processing and memory resources. In a CAD modeling program, loading a new model or rendering a new layer within an existing model may likewise require significant and prolonged use of available resources. The user context monitor may detect such events through queries supported by the operating system, the applications being monitored and/or the embedded controller of the IHS.

With the user context monitor initiated, at 1215, the IHS is put into operation with the user operating applications provided by the operating system and/or by the heterogeneous computing platform. As described, in some instances, the IHS may be a portable computing device, such as a laptop computer. During the ongoing operation of such a portable IHS, it may be used in a variety circumstances and in a variety of physical environments. Over intervals of various durations, the user may operate the IHS in a continuous manner, whether actively, such as playing a video game or editing a document, or passively, such as watching streaming media. After a period of continuous use of the IHS, at 1220, the user may then transition to other contexts of operation of the IHS, which may be indicated by a change in user presence or engagement relative to the IHS.

In one user context of IHS operations, the user may stop an interval of continuous operation of the IHS by leaving the area in which the IHS is located, such as walking out of the room in which the IHS is docked, or walking away from the immediate area in which the IHS is located. In this user context of operation of the IHS, the user is not physically located in proximity to the IHS, and thus may be determined to be not actively operating the IHS. In some instances, the user may be in sufficient proximity in order to operate the IHS passively, such as listening or watching streaming media, but may be too far away to provide any user inputs, such as via peripherals coupled to the IHS, and thus too far away to actively operate the IHS. In scenarios where voice commands are supported, threshold for determining whether the user is too far away to actively operate the IHS may evaluate sensor data indicating the user is not within audible range of the IHS.

In another user context of IHS operations, the user may remain in close proximity to the IHS, but may interrupt an interval of continuous, active operation of the IHS by engaging and participating in a conversation with another individual. In such instances, the other individual may be physically located in the same room or area as the user, or the other individual may be physically located elsewhere and the conversation is conducted via a personal communications device. In such instances, the user's attention may switch from the IHS to the conversation. As a consequence, the user's attentiveness relative to the IHS may be indicated by the user turning their face, or just their gaze, away from the display of the IHS. In addition, the user may rotate their body, or at least their torso, away from the IHS such that their upper body is no longer facing the display of the IHS. As described, such changes in attentiveness of the user may be confirmed by changes in the user's inputs to the IHS. For instance, the interruption of an interval of continuous operation of the IHS may be confirmed by the lack of any mouse, keyboard and/or voice inputs by the user.

As described, an additional context of the user's operation of the IHS may include the software applications that are being operated by the user of the IHS and specific events that are initiated by the user within these software applications. For instance, the launching of an application that is known to require prolonged use of high-performance capabilities of the heterogeneous computing platform, such as a video game, may be detected. Embodiments may also detect various user-driven events within certain software applications. For instance, the loading of a large file by a graphics application may indicate a need for increased performance by devices of the heterogeneous computing platform that support this graphics application, such as a GPU. In another example, embodiments may detect the launching of a collaborative session, such as a videoconference session, within an application running in the operating system and that is expected to consume significant processing resources for the duration of the session.

At 1225, the user context monitor of the IHS detects such changes in the context of the user's operation of the IHS, such as changes in the user's presence and/or attentiveness relative to the IHS and such as software application operations by the user. As indicated in FIG. 12, at 1230, the user context monitor reports these detected changes to the hardware component of the heterogeneous computing platform that has been designated as the firmware services orchestrator, such as described with regard to FIG. 6. As described, a firmware services orchestrator may be implemented using one or more components of the heterogeneous computing platform, such as by an embedded controller, aDSP and/or sensor hub. Also as described, a firmware services orchestrator may operate using authenticated firmware in itself providing services, such as the described management of power allocations within a heterogeneous computing platform of an IHS based on detected changes in the context of the user's operation of the IHS.

In some embodiments, at 1232, the firmware services orchestrator may classify collected user presence engagement and/or presence information according to various recognized user contexts. For instance, if collected sensor information indicates the user is not in proximity to the IHS and there are no indications the user is passively using the IHS from a distance, embodiments may determine the collected information corresponds to an "away" user context. In another example, if collected sensor information indicates the user is not in proximity to the IHS but appears to be in passive use of the IHS, such as the user listening to streaming audio generated by the IHS, embodiments may determine the collected information corresponds to a "nearby" user context. In another example, if collected sensor information indicates the user in proximity to the IHS but is inattentive, such as while engaged in a conversation, embodiments may determine the collected information corresponds to an "inattentive" user context. In this manner, any number of user contexts may be defined and used to classify the collected sensor information that relates the user's presence and/or engagement with the IHS.

In some embodiments, such user context determinations may be implemented by the firmware services orchestrator. In some embodiments, these user context determinations may be implemented, in full or in part, by other components of the firmware services orchestrator, such as the sensor hub. In this manner, the device(s) that implements functions of the firmware services orchestrator may rely on other services that are implemented using firmware loaded by other devices of the heterogeneous computing platform. For instance, at 1235, the firmware services orchestrator may query another component of the heterogeneous computing platform for a mapping of power allocation settings that have been associated with specific user contexts. For instance, in an embodiment where the firmware services orchestrator is implemented by the sensor hub of the IHS, mappings of power allocation settings to different user contexts may be maintained by the embedded controller of the IHS. In these embodiments, the embedded controller may store the power allocation mappings in a persistent manner such that the mappings remain available for use despite the operating system of the IHS being reinstalled. For instance, the embedded controller of the IHS may include a persistent memory device that is used to store the power allocation mappings that are available for use by the firmware services orchestrator, where this memory device may be additionally used to store other persist information such as digital signatures that correspond to authentic firmware for use by the embedded controller and/or digital signatures corresponding to authentic firmware for use by other hardware components of the IHS.

Once the power allocation settings that are mapped to different user contexts have been identified, these power allocation settings are retrieved and provided to the firmware services orchestrator. At 1240, the firmware services orchestrator configures power allocations within the heterogeneous computing platform according to these power allocation settings. For instance, in a scenario where the user context includes the launching of a graphics modeling application on a GPU of the heterogeneous computing platform, the orchestrator may initiate procedures for allocating a larger share of available power for use by the GPU, with other devices of the heterogeneous computing platform receiving smaller shares of the available power. In a scenario where the user context includes the launching of a particular event within a software application, such as re-initializing a virtual reality environment that is operated by an application supported by the operating system of the IHS, the orchestrator may initiate procedures for allocating a larger share of available power to the GPU and the CPU of the IHS, with the power allocations reduces to a minimal level for all other devices of the heterogeneous computing platform, such as network controllers and storage drives.

Through such power allocations, embodiments may support various modes of operation of the IHS described herein, such as the various modes that support thermal constraints specified for operation of the IHS. For example, embodiments may support the ability for an IHS to provide performance mode capabilities due to allocation of available power, and hence available processing capabilities, to leverage the most capable devices of the heterogeneous computing platform for particular tasks. For instance, in scenarios where launching of a graphics application on the GPU is detected, the allocation of a greater share of power to the GPU by embodiments supports the ability for the most efficient device of the heterogeneous computing platform to be fully utilized to support the graphics allocation while staying within the thermal limitations of a quiet mode or a cool mode supported by the IHS.

In another scenario, sensor data collected by the heterogeneous computing platform may indicate the user is not in close proximity to the IHS, but is nonetheless in the vicinity of the IHS. For example, sensor data may conclusively determine the user is not seated in view of the display screen of the IHS, but audio data may indicate the user is within audio range of the IHS. In some embodiments, such a user context may be mapped to thermal settings in which the airflow cooling restrictions may be adjusted to allow increased airflow cooling, and thus increased noise, but may maintain temperature restrictions that limit the outer surface temperatures of the IHS in light of the user returning to operation of the IHS at any moment. In such instances, embodiments may allocate power among the devices of the heterogeneous computing platform in a manner that allows an increase in performance such that noise levels are increased, but surface temperatures of the IHS are maintained within cool mode temperature levels.

In another scenario, embodiments may detect a change in user context in which the user's attention with respect to the IHS appears to have waned. In such instances, embodiments may determine whether to relax any of the thermal and/or acoustic restrictions that are currently being enforced. For instance, in a scenario where the thermal constraints being enforced limit the noise and/or temperature levels of the IHS and the user is determined to be inattentive, embodiments may allocate power and temporarily relax restrictions on the levels of noise generated by the IHS, albeit at levels that may be noticeable but are not distracting to the user. Through the additional cooling that is supported by the relaxation in noise levels, embodiments may utilized temporary power availability to initiate various administrative processes and procedures that have been delayed due to the noise level restrictions. For instance, during this interval of increased cooling, embodiments may support applications such as a web browser or CAD modeling program to initiate garbage collection or other memory management functions that have been restricted due to the thermal constraints that are in place. In another example, thermal constraints in place during operation of the IHS in a gaming session may be relaxed during an interval when the user is deemed to be inattentive. During this interval, embodiments support additional power, and thus additional cooling and performance, for one or more devices of the heterogeneous computing platform in use to operate the video game. For instance, an increase in power available to a network controller may support network operations by which expanded maps or other video game data may be downloaded for use upon the user resuming operation of the IHS.

Also through such power allocations, embodiments may also support maintenance of the IHS. In some embodiments, one element of the heterogeneous computing platform may support remote management of the IHS. For instance, an embedded controller, such as described with regard to FIG. 3, may implement a secure execution environment through which a variety of telemetry data may be collected from the IHS and directly from managed devices of the IHS. In some embodiments, the embedded controller may utilize out-of-band management connections with various of the managed devices in order to collect telemetry data and in initiating maintenance procedures for these managed devices, such as initiating firmware updates. In some modes of operating an IHS, such as in a quiet mode, components of an IHS, such as management operations by the embedded controller may be minimized and the embedded controller may be configured to operate in a low-power mode. In embodiments, management operations by the embedded controller, such as firmware updates to devices of the heterogenous computing platform and telemetry operations, may be conducted during intervals where a change in user context provides an opportunity to temporarily allocate power to devices of the heterogeneous computing platform and temporarily deviate from the thermal constraints under which the IHS is operating.

However, some management operations of the embedded controller may nonetheless require that the embedded controller be occasionally utilized. For instance, while operating in a quiet mode with the embedded controller operating in a low-power mode, an attempt by a remote process to access privileged resource of the IHS may result in the embedded controller initiating a security scan. Upon this event being detected by the monitoring process of the heterogeneous computing platform may schedule a security scan for the IHS. Upon detecting an interval where the user is not in proximity to the IHS, embodiments may allocate additional power for use by the embedded controller for the duration of the scan, or at least until the user returns to the IHS. In another illustrative example, a notification of a pending firmware update for a component of the heterogeneous computing platform by the embedded controller may trigger an allocation of additional power for use by the embedded controller during an interval when the user is not in proximity to the IHS. In this manner, embodiments may support occasional management operations by embedded controller while maintaining operations withing the existing thermal constraints under which the IHS is operating. Through reallocation of available power, overall power budgets for the IHS based on the thermal constraints are maintained, such as supporting cool mode and quiet modes of IHS operation.

In some embodiments, the orchestrator implements such remote management capabilities of the IHS, such as in scenarios where the embedded controller implements the described orchestrator capabilities. In other embodiments, the orchestrator may be distinct from the device implementing remote management capabilities. In either case, the orchestrator determines whether each of the managed devices coupled to the IHS is managed via a sideband connection, such as an I2C bus that connects a device to an embedded controller providing remote management of the IHS. In scenarios where a change in user context has been detected such that an opportunity is present for an increase in performance, embodiments may utilize this interval to provide power for conducting pending remote management operations, such as by the embedded controller. Accordingly, embodiments may activate controllers used to manage sideband management buses of the embedded controller, such as the described I2C busses, for use during the detected change in user context. While activated from a low-power state, pending management operations may be conducted, such as collection of telemetry from managed devices and reporting of telemetry to remote diagnostic systems.

In instances where devices of the heterogenous computing platform are managed by an embedded controller via a sideband management connection, management operations are conducted using communication transmitted via a sideband bus that is mastered by the embedded controller. With exclusive control of such sideband management busses, the embedded controller does not have to rely on any intermediary components to interface with managed devices. Accordingly, management of devices of an IHS via a sideband management bus may be conducted more reliably and with minimal latency, thus supporting the ability of the embedded controller to precisely manage operational aspects of a managed device, such as managing operational temperatures and performance characteristics of a managed device, during short intervals where the user is not in proximity to the IHS, or is otherwise inattentive.

In-band management of a managed device may require an embedded controller providing remote management to transmit managed communications via one or more intermediary systems that may include the operating system and any number of applications running in the operating system. As a result, delivery of management communications via in-band communication channels results in at least some unreliability and also results in significant delays in delivery of communications when compared to sideband communications. Accordingly, embodiments utilize opportunities to active sideband communication capabilities of an embedded controller in order to complete pending management operations as quickly as possible, thus increasing the likelihood the operations can be completed, and thermal constraints can be met, prior to the user retuning to operation of the IHS.

In this manner, embodiments support operation of the IHS according to a selected set of thermal constraints, while utilizing available opportunities to utilize idle capabilities of the IHS in order to support operation of the IHS that may include critical management operations, such as firmware updates and security procedures. For instance, during operation during quiet mode thermal constraints, embodiments may determine a user context in which the user is away from the IHS and may reallocate available power for use by higher-power processing devices of the heterogeneous computing platform in order to complete pending operations as quickly as possible while the user as away and cooling resources of the IHS can be utilized without regard to generated levels of noise, or at lease while generating moderate levels of noise. Upon detecting the user in proximity to the IHS, the orchestrator receives such notifications from the heterogeneous computing platform and initiates procedures for returning power allocations to lower power processing components that operate with less cooling noise. The rate at which power is reallocated to lower power processing resources may be modulated based on updated user proximity information that indicates the user is indeed returning and is resuming operation of the IHS. In some instances, the user may return to the proximity of the IHS, but not resume active operation of the IHS. During this interval where the user is nearby but inattentive, embodiments may allocate power among the devices of the heterogeneous computing platform in order to maintain moderate levels of cooling noise that is not readily noticeable to the user. In this same manner, embodiments may detect an interval where the user is not in proximity to the IHS such that power can reallocated to higher power resources of the heterogeneous computing platform in order to complete pending tasks while the user is away. Upon detecting the user in proximity to the IHS, power may be reallocated to high power processing resources of the IHS, which may temporarily raise the outer surface temperature of the IHS, but may allow critical tasks to be completed, such as allowing firmware updates by the embedded controller.

In some embodiments, configuration of power allocation settings may be supported though an interface provided by the operating system, such as via a kernel-level process of the operating system. However, in some implementations, the power settings may be configured directly with the individual components of the heterogeneous computing platform and directly with the cooling components of the IHS. For instance, embodiments may configure power allocations through the orchestrator invoking ACPI configurations that are supported by the processors/cores of the heterogeneous computing platform, such as CPUs and/or other host processors described with regard to FIG. 3, where the ACPI configurations support restrictions on power consumption by a processor of the heterogeneous computing platform. In some embodiments, the described sideband management capabilities may be utilized by the orchestrator, such as the embedded controller, in order to configure performance capabilities, such as power draws and maximum operating frequencies, and cooling operations, such as operating cooling fans.

Through such power allocation within the heterogeneous computing platform, embodiments may adjust the allocation of available power within the heterogeneous computing platform in a manner that allows higher power operations by the IHS during intervals when the user is inattentive with respect to the IHS. By restricting generated noise and temperatures of IHS during intervals when the user is attentive and actively operating the IHS, embodiments support operation according to user specified thermal constraints, such as operating within quiet or cool modes of operation. Embodiments also support detecting and utilizing intervals when the user is not present or not engaged in order to initiate power reallocations that can support pending operations, such as important updates. However, upon the user returning to operation of the IHS, embodiments support returning to operation within the user specified thermal constraints. Accordingly, as indicated in FIG. 12, upon adjusting the power allocation for the heterogeneous computing platform in response to user inattentiveness or the user not being present in proximity to the IHS, embodiments return to 1220 to in monitoring for further changes in user context. When a change in user context indicates the user is back in proximity to the IHS and/or has resumed attentiveness, embodiments evaluate the user context to determine a set of power settings by which to adjust the power allocation for the heterogeneous computing platform.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a heterogeneous computing platform comprising a plurality of devices; and
a memory coupled to the heterogeneous computing platform, wherein the memory comprises a plurality of sets of firmware instructions, wherein each of the sets of firmware instructions, upon execution by a respective device among the plurality of devices, enables the respective device to provide a corresponding firmware service, and wherein an Embedded Controller (EC) among the plurality of devices operates as an orchestrator configured to:
  receive a hint from a host Operating System (OS), the hint based on a user presence status and a user engagement level determined using user context information comprising video data captured using a camera;
  allocate based, at least in part, upon the hint, a first amount of power to a first one of the plurality of devices and a second amount of power to a second one of the plurality of devices; and
  in response to a user presence status or a user engagement level change detected using updated user context information, modify the allocation, comprising reallocate power from a Central Processing Unit (CPU) to at least one of: a Neural Processing Unit (NPU), a Tensor Processing Unit (TSU), a Neural Network Processor (NNP), or an Intelligence Processing Unit (IPU), based at least in part on a rate modulated by a user's distance from the IHS.

2. The IHS of claim 1, wherein the user context information further comprises audio data captured using a microphone, and wherein the hint further comprises an indication that the host OS is executing an application or operation.

3. The IHS of claim 2, wherein the application or operation comprises at least one of: a gaming session, a video conferencing application, an Artificial Intelligence (AI) operation, or a data download operation.

4. The IHS of claim 1, wherein the user presence status comprises an indication of presence, absence, or distance of a user with respect to IHS.

5. The IHS of claim 4, wherein the user engagement level comprises a level of inattention of a user with respect to content displayed by the IHS.

6. The IHS of claim 1, wherein the heterogeneous computing platform comprises at least one of: a x86 processor or an ARM processor.

7. The IHS of claim 1, wherein the allocation limits an outer surface temperature of the IHS, and wherein the modified allocation reduces the limit by a first amount in response to the user presence status indicating the user is present and the user engagement level indicating the user is inattentive.

8. The IHS of claim 7, wherein the modified allocation reduces the limit by a second amount greater than the first amount in response to the user presence status indicating the user is present and the user engagement level indicating the user is attentive.

9. The IHS of claim 1, wherein the allocation limits noise generated by the IHS, and wherein the modified allocation reduces the limit by a first amount in response to the user presence status indicating the user is present and the user engagement level indicating the user is inattentive.

10. The IHS of claim 9, wherein the modified allocation reduces the limit by a second amount greater than the first amount in response to the user presence status indicating the user is present and the user engagement level indicating the user is attentive.

11. The IHS of claim 1, wherein the modified allocation enables the orchestrator to perform management operations at least in part, at a rate modulated by a user's distance from the IHS.

12. The IHS of claim 1, wherein to modify the allocation, the orchestrator is configured to allocate power from a Central Processing Unit (CPU) to a network controller.

13. The IHS of claim 1, wherein to modify the allocation, the orchestrator is configured to allocate power from a network controller to a Central Processing Unit (CPU).

14. The IHS of claim 1, wherein to modify the allocation, the orchestrator is configured to allocate power from a Central Processing Unit (CPU) to a Graphics Processing Unit (GPU).

15. The IHS of claim 1, wherein to modify the allocation, the orchestrator is configured to allocate power from a Graphics Processing Unit (GPU) to a Central Processing Unit (CPU).

16. The IHS of claim 1, wherein to modify the allocation, the orchestrator is configured to allocate power from at least one of: a Neural Processing Unit (NPU), a Tensor Processing Unit (TSU), a Neural Network Processor (NNP), or an Intelligence Processing Unit (IPU) to a Central Processing Unit (CPU).

17. A memory coupled to a heterogeneous computing platform of an Information Handling System (IHS), wherein the heterogeneous computing platform comprises a plurality of devices, wherein the memory is configured to receive a plurality of sets of firmware instructions, wherein each set of firmware instructions, upon execution by a respective device among the plurality of devices, enables the respective device to provide a corresponding firmware service without any involvement by any host Operating System (OS), and wherein an Embedded Controller (EC) among the plurality of devices operates as an orchestrator configured to:
  receive a hint from one of the plurality of devices, the hint based on a user presence status and a user engagement level determined using user context information comprising at least one of: audio data captured using a microphone, or video data captured using a camera;
  classify based, at least in part, upon the user presence status and user engagement level, the user context information as at least one of: away, nearby, or inattentive;
  allocate based, at least in part, upon the classified user context information, a first amount of power to a first one of the plurality of devices and a second amount of power to a second one of the plurality of devices; and
  in response to a user presence status or a user engagement level change detected using updated user context information, modify the allocation, comprising reallocate power from a Central Processing Unit (CPU) to at least one of: a Neural Processing Unit (NPU), a Tensor Processing Unit (TSU), a Neural Network Processor (NNP), or an Intelligence Processing Unit (IPU), based at least in part on a rate modulated by a user's distance from the IHS.

18. A method, comprising:

receiving a hint from one of a plurality of devices configured in an Information Handling System (IHS), the hint based on an IHS user presence status and an IHS user engagement level determined using IHS user context information comprising at least one of: audio data captured using a microphone, or video data captured using a camera;

classifying based, at least in part, upon the IHS user presence status and the IHS user engagement level, the user context information as at least one of: away, nearby, or inattentive;

detecting, based at least in part on the classified user context information, a nearby and inattentive time interval wherein the IHS user is both nearby and inattentive;

allocating based, at least in part, upon detecting the nearby and inattentive time interval, a first amount of power to a first one of the plurality of devices and a second amount of power to a second one of the plurality of devices, wherein the allocated first amount of power and second amount of power are configured to maintain moderate levels of cooling noise; and in response to a user presence status or a user engagement level change detected using updated user context information, modifying the allocation, comprising reallocating power from a Central Processing Unit (CPU) to at least one of: a Neural Processing Unit (NPU), a Tensor Processing Unit (TSU), a Neural Network Processor (NNP), or an Intelligence Processing Unit (IPU), based at least in part on a rate modulated by a user's distance from the IHS.

* * * * *